United States Patent
Ferrari et al.

(10) Patent No.: US 12,520,877 B2
(45) Date of Patent: Jan. 13, 2026

(54) SMOKING DEVICE WITH AUTHENTICATION MEANS

(71) Applicant: Philip Morris Products S.A., Neuchatel (CH)

(72) Inventors: Eva Ferrari, Bologna (IT); Andrew Mclauchlan, Neuchatel (CH); Maxime Chateau, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 408 days.

(21) Appl. No.: 17/998,448

(22) PCT Filed: May 6, 2021

(86) PCT No.: PCT/EP2021/062005
§ 371 (c)(1),
(2) Date: Nov. 10, 2022

(87) PCT Pub. No.: WO2021/228678
PCT Pub. Date: Nov. 18, 2021

(65) Prior Publication Data
US 2023/0346037 A1 Nov. 2, 2023

(30) Foreign Application Priority Data
May 12, 2020 (EP) .................... 20174273

(51) Int. Cl.
*A24F 40/49* (2020.01)
*A24F 40/51* (2020.01)
(Continued)

(52) U.S. Cl.
CPC .............. *A24F 40/49* (2020.01); *A24F 40/51* (2020.01); *A24F 40/60* (2020.01); *G06F 21/31* (2013.01)

(58) Field of Classification Search
CPC .......... A24F 40/49; A24F 40/51; A24F 40/60; G06F 21/31; A61M 15/008; G16H 20/10
See application file for complete search history.

(56) References Cited

U.S. PATENT DOCUMENTS

| 2014/0246035 A1 | 9/2014 | Minskoff et al. |
| 2017/0346635 A1 | 11/2017 | Gummeson et al. |

(Continued)

FOREIGN PATENT DOCUMENTS

| CN | 109581937 A | 4/2019 |
| CN | 111096494 A | 5/2020 |

(Continued)

OTHER PUBLICATIONS

Japanese Office Action Issued Dec. 4, 2023 in Japanese Application No. 2022-567245, with English translation, 8 pgs.

(Continued)

*Primary Examiner* — Vernal U Brown
(74) *Attorney, Agent, or Firm* — Oblon, McClelland, Maier & Neustadt, L.L.P.

(57) ABSTRACT

An aerosol-generating system is provided, including: an aerosol-generating device having a locked state in which the aerosol-generating device is prohibited from generating aerosol and an unlocked state in which the aerosol-generating device is permitted to generate aerosol; and a receiving device to at least partially receive the aerosol-generating device, each of the aerosol-generating and the receiving devices includes a communication interface to communicatively couple the aerosol-generating device with the receiving device, the receiving device including a control arrangement with at least one biometric sensor to authenticate a user of the system based on sensing at least one biometric feature of the user, and the control arrangement being configured to transmit an authentication signal to the aerosol-generating device to configure the aerosol-generating device into the (Continued)

locked state or into the unlocked state, the authentication signal being indicative of a successful or an unsuccessful authentication of the user at the receiving device.

15 Claims, 3 Drawing Sheets

(51) Int. Cl.
*A24F 40/60* (2020.01)
*G06F 21/31* (2013.01)

(56) References Cited

U.S. PATENT DOCUMENTS

| | | | |
|---|---|---|---|
| 2019/0197225 | A1 | 6/2019 | Khalifa et al. |
| 2020/0394291 | A1 | 12/2020 | Khalifa et al. |
| 2021/0011446 | A1 | 1/2021 | Anderson et al. |
| 2021/0298363 | A1* | 9/2021 | Daugherty .............. G06F 21/88 |
| 2022/0016364 | A1* | 1/2022 | Kilger .................. A24F 40/30 |

FOREIGN PATENT DOCUMENTS

| | | |
|---|---|---|
| EP | 3 945 890 A1 | 2/2022 |
| JP | 2006-295382 A | 10/2006 |
| JP | 2018-514196 | 6/2018 |
| JP | 2018-536388 A | 12/2018 |
| KR | 10-2017-0083614 | 7/2017 |
| KR | 10-2017-0083614 A | 7/2017 |
| RU | 2 655 596 C2 | 5/2018 |
| WO | WO 2016/156609 A1 | 10/2016 |
| WO | WO 2017/018428 A1 | 2/2017 |
| WO | WO 2019/126805 A1 | 6/2019 |
| WO | WO 2019/175810 A1 | 9/2019 |

OTHER PUBLICATIONS

Russian Office Action issued Apr. 27, 2023 in Russian Application No. 2022132193, with English translation. 11 pgs.
Russian Search Report issued Apr. 27, 2023 in Russian Application No. 2022132193, with English translation, 4 pgs.
Japanese Office Action issued Jul. 8, 2024 in Japanese Application No. 2022-567245 (with unedited computer generated English language translation), 7 pages.
Korean Office Action issued Sep. 9, 2024 in Korean Patent Application No. 10-2022-7039077 (with English translation), 14 pages.
International Search Report & Written Opinion issued Jul. 28, 2021 in PCT/EP2021/062005, filed on May 6, 2021, 14 pages.
Written Opinion issued Apr. 19, 2022 in PCT/EP2021/062005, filed on May 6, 2021, 6 pages.
European Search Report issued Oct. 2, 2020 in EP 20174273.1, filed on May 12, 2020, 8 pages (with Written Opinion).
Extended European Search Report issued Apr. 17, 2025 in European Patent Application No. 24207353.4, 10 pages.
Japanese Decision of Grant issued Jan. 6, 2025, in Japanese Patent Application 2022-567245, 2 pages.
Korean Office Action issued Sep. 9, 2024 in Korean Patent Application No. 10-2022-7039077 (with English Translation), citing reference 15 therein, 13 pages.
Extended European Search Report issued Apr. 17, 2025 in European Patent Application No. 24207353.4, citing reference 16 therein, 10 pages.
International Search Report & Written Opinion issued Jul. 28, 2021 in PCT/EP2021/062005, filed on May 6, 2021, citing documents 1-4 and 15-16 therein, 14 pages.
Written Opinion issued Apr. 19, 2022 in PCT/EP2021/062005, filed on May 6, 2021, citing documents 3-4 and 15-16 therein, 6 pages.
European Search Report issued Oct. 2, 2020 in EP 20174273.1, filed on May 12, 2020, citing documents 3-4 & 15-16 therein, 8 pages (with Written Opinion).

* cited by examiner

SMOKING DEVICE WITH AUTHENTICATION MEANS

The present disclosure generally relates to the field of aerosol-generating systems or apparatuses for use of an aerosol-generating article or smoking article. In particular, the present disclosure relates to an aerosol-generating system that includes an aerosol-generating device and a receiving device, to an aerosol-generating device for such a system, and to a receiving device for such a system. The present disclosure further relates to a computer-implemented method of authenticating a user at an aerosol-generating system, a user device for configuring and/or registering an aerosol-generating system, and to a method of operating such user device. Further, the present disclosure relates to one or more computer programs and to one or more computer-readable mediums.

Aerosol-generating systems or apparatuses usually comprise an aerosol-generating device for generating an aerosol and a receiving device or main unit, for example, for storing the aerosol-generating device. Typically, aerosol-generating devices are designed as handheld devices that can be used by a user for consuming, for instance in one or more usage sessions, aerosol generated by an aerosol-generating article or smoking article. Usually, aerosol-generating articles comprise an aerosol-forming substrate, such as a tobacco containing substrate, and/or a cartridge comprising a liquid. For generating the aerosol during use or consumption, for example, heat can be applied or transferred from a heating element or heat source in the aerosol-generating device to heat at least a portion of the aerosol-generating article.

Exemplary aerosol-generating articles for use with aerosol-generating devices can comprise an aerosol-forming substrate that is assembled, often with other elements or components, in the form of a stick. Such a stick can be configured in shape and size to be inserted at least partially into the aerosol-generating device, which, for example, can comprise a heating element for heating the aerosol-generating article and/or the aerosol-forming substrate. Other exemplary aerosol-generating articles can comprise a cartridge containing a liquid that can be vaporized during aerosol consumption by the user. Also, such a cartridge can be configured in shape and size to be inserted at least partially into the aerosol-generating device. Alternatively, the cartridge may be fixedly mounted to the aerosol-generating device and refilled by inserting liquid into the cartridge.

In some conventional aerosol-generating systems or stand-alone aerosol-generating devices, a fingerprint sensor is arranged on the hand-held aerosol-generating device for authenticating a user. For instance, document US 2015/122252 A1 describes a hand-held vaporizer that includes a fingerprint scanner for locking the vaporizer for use if an authorized fingerprint is not detected through the fingerprint scanner. This, however, may result in a complex design, configuration and appearance of the aerosol-generating device.

Therefore, it may be desirable to provide for an improved aerosol-generating system, an improved receiving device for such system and/or an improved aerosol-generating device for such system, for example, providing authentication means to ensure that only an authorized user, such as an adult individual or user, a user having reached a predetermined age threshold, and/or a proprietor of the aerosol-generating system is permitted to use the aerosol-generating system, in particular for aerosol consumption.

This is achieved by the subject matter of the independent claims, wherein further embodiments are incorporated in the dependent claims and following description.

In the following, various aspects as well as embodiments and examples of those aspects of the present disclosure are described. It should be noted that various aspects of the present disclosure relate at least in part, primarily or entirely to one or more of an aerosol-generating system, an aerosol-generating device, a receiving device for an aerosol-generating system, and a user device.

It is emphasized, however, that any feature, step, function, element, technical effect and/or advantage described hereinabove and hereinbelow with reference to one aspect of the present disclosure, equally applies to any other aspect of the present disclosure, as described hereinabove and hereinbelow.

According to a first aspect of the present disclosure, there is provided an aerosol-generating system, which comprises an aerosol-generating device configured to generate aerosol, wherein the aerosol-generating device has a locked state, in which the aerosol-generating device is prohibited from generating aerosol, and an unlocked state, in which the aerosol-generating is permitted to generate aerosol. The aerosol-generating system (also referred to as "system" hereinafter) further comprises a receiving device configured to at least partially receive the aerosol-generating device. Each of the aerosol-generating device and the receiving device includes a communication interface for communicatively coupling the aerosol-generating device with the receiving device. Therein, the receiving device includes a control arrangement with at least one biometric sensor configured to authenticate a user of the aerosol-generating system based on sensing at least one biometric feature of the user. Further, the control arrangement is configured to transmit, for example via the communication interface of the receiving device and the communication interface of the aerosol-generating device, an authentication signal to the aerosol-generating device to configure and/or switch the aerosol-generating device into the locked state or the unlocked state. Therein, the authentication signal is indicative, descriptive, and/or representative of a successful or an unsuccessful authentication of the user at the receiving device and/or at the aerosol-generating system.

By arranging the biometric sensor at the receiving device and transmitting the authentication signal from the receiving device to the aerosol-generating device, the aerosol-generating device can be configured and/or switched into the locked or the unlocked state depending on whether the authentication of the user based on sensing the at least one biometric feature was successful or unsuccessful. For instance, configuration of the aerosol-generating device into the unlocked state by an unauthorized user can be effectively and reliably be prohibited, such that use of the aerosol-generating system for aerosol consumption by unauthorized users can be effectively and reliably prohibited.

Moreover, arranging the at least one biometric sensor at the receiving device may allow to reliably, effectively and securely authenticate the user at minimum modifications for the aerosol-generating device, for instance compared to arranging the at least one biometric sensor at the aerosol-generating device. In particular, by arranging the at least one biometric sensor at the receiving device of the aerosol-generating system, no modification of the aerosol-generating device in terms of its geometry, shape and/or design may be required, as will be further discussed hereinafter.

In the context of the present disclosure, an authorized user (also referred to as "verified user") can refer to or denote a proprietor of the aerosol-generating system, an adult, an adult individual, a user of full age, a user having reached an age threshold, a user having reached majority age, and/or a user that has been authorized to configure the aerosol-generating device by another authorized user, such as by the proprietor. Further, an unauthorized user can refer to or denote an underage user, a user not having reached an age threshold, a child, or any other user who is unauthorized to configure the aerosol-generating device, in particular unauthorized to configure the aerosol-generating device into the unlocked state for aerosol consumption.

The aerosol-generating device may be configured or designed as a hand-held device usable by the user or authorized user to consume an aerosol-generating article, for example during one or more usage sessions (also referred to as "experiences" or "experience sessions").

For instance, an aerosol-generating article usable with the aerosol-generating device can comprise an aerosol-forming substrate, such as a tobacco containing substrate, which may be assembled, optionally with other elements or components, in the form of a stick at least partially insertable into the aerosol-generating device. Alternatively or additionally, an aerosol-generating article usable with the aerosol-generating device can comprise at least one cartridge containing a liquid that can be vaporized during aerosol consumption by the user. Such cartridge can be a refillable cartridge fixedly mounted at the aerosol-generating device or the cartridge can be at least partially inserted into the aerosol-generating device.

The locked state of the aerosol-generating device may refer to a locked configuration and the unlocked state may refer to an unlocked configuration of the aerosol-generating device. In the locked state or configuration, the aerosol-generating device is prohibited from generating aerosol. This may mean that the aerosol-generating device is locked for aerosol consumption by the user in the locked state and/or that the aerosol-generating device is configured in the locked state, such that no aerosol can be generated. On the other hand, in the unlocked state or configuration, the aerosol-generating device is permitted or allowed to generate aerosol. This may mean that the aerosol-generating device is unlocked for consumption of aerosol by the user in the unlocked state and/or that the aerosol-generating device is configured in the unlocked state, such that aerosol can be generated.

Accordingly, when the aerosol-generating device is in the locked state, the aerosol-generating device may not be actuatable by the user to generate aerosol, and, when the aerosol-generating device is in the unlocked state, the aerosol-generating device may be actuatable by the user to generate aerosol. In other words, in the locked state of the aerosol-generating device, access to one or more functions or functionalities of the aerosol-generating device, including aerosol generation, may be prohibited for the user, and in the unlocked state of the aerosol-generating device, access to one or more functions or functionalities of the aerosol-generating device, including aerosol generation, may be permitted for the user.

The aerosol-generating device may comprise a control circuitry for controlling one or more functions or functionalities of the aerosol-generating device and/or for processing the authentication signal. The control circuitry may comprise one or more processors for data processing, such as for processing the authentication signal. Alternatively or additionally, the aerosol-generating device may comprise a data storage and/or memory for storing data, such as for example software instructions, a computer program, and/or other data.

The receiving device may generally refer to a supporting device for supporting and/or storing the aerosol-generating device. The receiving device may be a portable receiving device. In the context of the present disclosure, the configuration of the receiving device "for at least partially receiving the aerosol-generating device" is to be construed broadly. For example, this may mean that the receiving device is configured for being physically coupled to the aerosol-generating device. Such physical coupling can, for example, comprise a mechanical coupling based on an attachment means, such as a hook mechanism, a latch mechanism, a snap-fit mechanism or the like, based on which the aerosol-generating device can be mechanically coupled to the receiving device and/or a housing thereof. Alternatively or additionally, the aerosol-generating device can be physically coupled to the receiving device based on a magnetic or electromagnetic coupling. Alternatively or additionally, the aerosol-generating device can be at least partially inserted into the receiving device, for example, into an opening of the receiving device.

Further, the aerosol-generating device and the receiving device may refer to physically separate components or elements of the aerosol-generating system. For communicating with each other and/or for exchanging data or signals, such as the authentication signal, each of the aerosol-generating device and the receiving device comprises at least one communication interface. The communication interfaces of the aerosol-generating device and the receiving device can be configured for wireless communication, for wired communication, or both. For instance, the communication interfaces of the aerosol-generating device and the receiving device can be configured for communicatively coupling the aerosol-generating device and the receiving device via an Internet connection, a wireless LAN connection, a WiFi connection, a Bluetooth connection, a mobile phone network, a 3G connection, an edge connection, an LTE connection, a BUS connection, a wireless connection, a wired connection, a radio connection, a near field connection, an IoT connection or any other connection using any appropriate communication protocol.

The control arrangement of the receiving device may be configured for controlling one or more functions or functionalities of the receiving device. The control arrangement may comprise one or more processors for data processing. Alternatively or additionally, the receiving device may comprise a data storage and/or memory for storing data, such as for example software instructions, a computer program, and/or other data.

The control arrangement and/or the least one biometric sensor of the control arrangement may be configured to determine, sense, analyse, acquire and/or detect one or more biometric features of the user to authenticate the user. For instance, authenticating the user may mean or comprise identifying the user, determining an identity of the user, verifying an identity of the user, and/or determining whether or not the user is authorized or verified to configure the aerosol-generating device, for example, into the unlocked state to permit generation of aerosol.

Accordingly, a "successful authorization" of the user may mean that the user was identified, based on detecting one or more biometric features of the user with the at least one biometric sensor, as being authorized for configuring the aerosol-generating device into the locked or unlocked state. An "unsuccessful authorization" of the user may mean that the user was not or was unsuccessfully identified, based on detecting one or more biometric features of the user with the at least one biometric sensor, as being authorized for configuring the aerosol-generating device into the locked or unlocked state.

Generally, the authentication signal may be usable for configuring the aerosol-generating device into the locked state or the unlocked state. In other words, the authentication signal may refer to a data signal or a data element allowing to configure and/or being usable for configuring the aerosol-generating device into the locked or unlocked state, to enter the aerosol-generating device into the locked or unlocked state, and/or to switch the aerosol-generating device into the locked or unlocked state. Therein, entering, configuring and/or switching the aerosol-generating device into the locked or unlocked state may mean or comprise actuating and/or configuring the aerosol-generating device, such that the aerosol-generating device is in the locked state or the unlocked state.

For example, the aerosol-generating device may be configured and/or switched into the locked state if or when the authentication signal is indicative of an unsuccessful authorization of the user, and the aerosol-generating device may be configured and/or switched into the unlocked state if or when the authentication signal is indicative of a successful authorization of the user. For example, the authentication signal may refer to a data signal, such as a binary signal, wherein a first value may indicate successful authorization of the user at the receiving device and a second value, different than the first value, may indicate unsuccessful authorization of the user at the receiving device. Further, the aerosol-generating device may be configured into the unlocked state if the authorization signal takes the first value and into the locked state if the authorization signal takes the second value.

Alternatively or additionally, the aerosol-generating device may be configured into one of the locked and the unlocked state if or when the authorization signal is transmitted by the receiving device, and configured into the other one of the locked and the unlocked state if or when no authorization signal is transmitted by the receiving device.

Accordingly, the authentication signal may refer to an anonymized data signal or data element indicating whether authorization of the user was successful or unsuccessful. Optionally, however, the authorization signal may be indicative of the one or more biometric features of the user sensed with the at least one biometric sensor, such that the aerosol-generating device can determine whether or not the user is authorized for configuring the aerosol-generating device into the locked or unlocked state.

Further, the aerosol-generating device can be instructed based on the authentication signal transmitted by the receiving device to enter and/or switch into the locked state or the unlocked state. Accordingly, the receiving device may be configured to instruct and/or cause the aerosol-generating device based on the authentication signal to enter and/or switch into the locked state or the unlocked state. Alternatively or additionally, the aerosol-generating device may be configured to process the received authentication signal and to configure itself, such that the aerosol-generating device is in the locked state or the unlocked state.

Further, the control arrangement of the receiving device may be configured to generate the authentication signal based on the determined one or more biometric features. The sensed one or more biometric features may, for example, be compared with one or more reference biometric features of the user to determine whether the user is authorized or unauthorized. Such one or more reference biometric features may, for example, be stored in a data storage or memory of the receiving device and/or a data storage or memory of the aerosol-generating device. For instance, the control arrangement of the receiving device may be configured to compare the one or more biometric features of the user, as sensed with the at least one biometric sensor, with the one or more reference biometric features stored in the data storage. Based on this comparison, the control arrangement of the receiving device may be configured to determine whether or not the user is authorized to configure the receiving device into the locked state or the unlocked state. The control arrangement may be further configured to generate a corresponding authentication signal indicative of whether the user was successfully or unsuccessfully authorized based on the one or more biometric features sensed with at least one biometric sensor, and to transmit the authentication signal to the aerosol-generating device. Therein, the authentication signal may merely indicate whether or not the user is authorized to configure the aerosol-generating device, but may not contain individual or personal data of the user, such as the one or more sensed biometric features. Hence, privacy may be effectively preserved.

Alternatively, however, the authentication signal may be descriptive, indicative and/or representative of the one or more biometric features, and the aerosol-generating device may be configured to compare the one or more biometric features sensed with the at least one biometric sensor with one or more reference biometric features, which may be stored in a data storage or memory of the aerosol-generating device.

As mentioned hereinabove, arranging the at least one biometric sensor at the receiving device may allow to reliably, effectively and securely authenticate the user at minimum modifications for the aerosol-generating device, for instance compared to arranging the at least one biometric sensor at the aerosol-generating device. In particular, by arranging the at least one biometric sensor at the receiving device of the aerosol-generating system no modification of the aerosol-generating device in terms of its geometry, shape and/or design may be required, such as a modification of a mechanical or physical coupling between the aerosol-generating device and the receiving device. Accordingly, based on the present disclosure, an authentication means can be added to or implemented in the aerosol-generating system, in particular without adding complexity on a mechanical coupling of the aerosol-generating device and the receiving device. For example, arranging the at least one biometric sensor on the aerosol-generating device might entail presence of a protrusion on an external wall of the aerosol-generating device, which may even result in a correspondent modification of the receiving device, for example if the aerosol-generating device can be at least partly inserted into the receiving device.

The at least one biometric sensor may be at least one of a fingerprint sensor, an iris recognition sensor, a voice recognition sensor, and a camera for face recognition for determining one or more biometric features of the user. Alternatively or additionally, the at least one biometric feature may comprise one or more of at least one fingerprint, at least one iris feature, at least one voice feature, and at least one facial feature allowing to determine the identity of the user, identify the user and/or to authenticate the user. It should be noted that also a plurality of biometric sensors may be arranged at the receiving device, for example biometric sensors of different types.

For authenticating the user, one or more reference biometric features may be stored in a data storage and/or memory of the receiving device. Alternatively or additionally the one or more reference biometric features may be stored in a data storage and/or memory of the aerosol-generating device. Generally, the one or more reference biometric features may be stored as biometric signature, biometric signature data, biometric data and/or biometric signature in the data storage of the receiving device and/or the aerosol-generating device. For example, the one or more reference biometric features may be acquired during and stored upon completion of an authorization or registration process, such as an age verification process, as will be further discussed hereinbelow.

Depending on the type of biometric sensor or the types of sensors used, the one or more reference biometric features may include one or more of at least one reference fingerprint, at least one reference iris feature, at least one reference voice feature, and at least one reference facial feature allowing to determine the identity of the user, identify the user and/or to authenticate the user.

The control arrangement of the receiving device and/or the at least one biometric sensor may be configured to acquire and/or sense at least one of at least one fingerprint of the user, at least one image of an iris of the user, at least one acoustic message including the user's voice, and at least one image of at least a part of the user's face. Alternatively or additionally, the control arrangement of the receiving device may be configured to authenticate the user and/or to determine whether or not the user is authenticated, in order to configure the aerosol-generating device, for example into the unlocked state, based on analysing one or more of the sensed biometric features, for example based on comparing one or more of the sensed biometric features with one or more of the reference biometric features.

The at least one biometric sensor may be arranged on or at a housing of the receiving device. For example, the at least one biometric sensor may be arranged on a side wall, an outer wall, a top wall, and/or a bottom wall of the receiving device.

The aerosol-generating device may include at least one energy storage for storing electrical energy and/or for supplying the aerosol-generating device with electrical energy, wherein the receiving device may be configured to supply electrical energy to the aerosol-generating device to charge the at least one energy storage of the aerosol-generating device. In other words, the receiving device may be configured to charge the aerosol-generating device and/or the at least one energy-storage thereof. The at least one energy storage of the aerosol-generating device may, for example, comprise at least one battery, at least one accumulator, at least one capacitor or any other energy storage.

The receiving device may be configured to supply the energy storage of the aerosol-generating device with electrical energy, when the aerosol-generating device is at least partially received by the receiving device. The receiving device may comprise one or more batteries for supplying electrical energy to the energy storage of the aerosol-generating device. Therein, the receiving device may be configured to supply the energy storage of the aerosol-generating device with electrical energy wirelessly, for example based on induction. Alternatively or additionally, the receiving device may be configured to supply the energy storage of the aerosol-generating device with electrical energy via one or more electrical connectors between the receiving device and the aerosol-generating device.

For instance, the aerosol-generating device and the receiving device may each include at least one electrical connector for electrically coupling the receiving device with the aerosol-generating device, when the aerosol-generating device is at least partially received by the receiving device.

By way of example, the receiving device may comprise an opening for at least partially receiving the aerosol-generating device. By at least partially inserting the aerosol-generating device into the opening, one or more electrical connections may be established between one or more electrical connectors of the aerosol-generating device and the receiving device. Alternatively or additionally, the aerosol-generating device may be physically and/or mechanically coupled to the receiving device, for example to a housing of the receiving device, such that the aerosol-generating device is at least partially received by the receiving device and such that one or more electrical connections can be established between the aerosol-generating device and the receiving device.

Optionally, establishing an electrical connection between the receiving device and the aerosol-generating device, for example via the one or more electrical connectors of the aerosol-generating device and the receiving device, may trigger establishing a communicative coupling and/or a communication connection between the receiving device and the aerosol-generating device, for example for transmission of the authentication signal. By way of example, the at least one electrical connector of the receiving device may be combined and/or may comprise the communication interface of the receiving device. In other words, the at least one electrical connector of the receiving device can be configured as communication interface for communicatively coupling the receiving device with the aerosol-generating device. Alternatively or additionally, the at least electrical connector of the aerosol-generating device may be combined and/or may comprise the communication interface of the aerosol-generating device. In other words, the at least one electrical connector of the aerosol-generating device can be configured as communication interface for communicatively coupling the aerosol-generating device with the receiving device. Accordingly, the authentication signal may be transmitted from the receiving device to the aerosol-generating device via the one or more electrical connectors of the receiving device and the aerosol-generating device. It should be noted, however, that the communication interface of one or both of the receiving device and the aerosol-generating device can be physically separate and independent from the at least one electrical connector of the receiving device and/or the aerosol-generating device.

The aerosol-generating system may be configured to configure, enter and/or switch the aerosol-generating device into the locked state based on one or more locking conditions. Alternatively or additionally, aerosol-generating system may be configured to configure, enter and/or switch the aerosol-generating device into the locked state based on determining whether one or more locking conditions are fulfilled. Such determination may be performed by one or more of the receiving device, the control arrangement of the receiving device, the aerosol-generating device, and the control circuitry of the aerosol-generating device. Generally, configuring the aerosol-generating device into the locked state based on one or more locking conditions may allow to automatically and/or periodically configure the aerosol-generating device into the locked state. In turn, a user may be required to authorize or re-authorize itself at the aerosol-generating system in dependence of the one or more locking conditions, such that use of the aerosol-generating system or device for aerosol consumption by an unauthorized user, for example in case of a loss of the aerosol-generating device or system, can be reliably prohibited and prevented.

The one or more locking conditions may include at least one of and/or may include determining at least one of:
- a maximum number of usage sessions of the aerosol-generating device by the user since a last successful authorization of the user at the receiving device;
- a maximum number of charge cycles performed since the last successful authorization of the user at the receiving device; and
- a maximum period of time expired since the last successful authorization of the user at the receiving device.

It should be noted, however, that also other locking conditions may be used for configuring the aerosol-generating device into the locked state, such as for example a maximum number of aerosol-generating articles used with the system, or the like.

Accordingly, one or more of the receiving device, the control arrangement of the receiving device, the aerosol-generating device, and the control circuitry of the aerosol-generating device may be configured to determine at least one of a number of usage sessions of the aerosol-generating device by the user since a last successful authorization of the user at the receiving device, a number of charge cycles performed since the last successful authorization of the user at the receiving device, and a period of time expired since the last successful authorization of the user at the receiving device. Further, one or more of the receiving device, the control arrangement of the receiving device, the aerosol-generating device, and the control circuitry of the aerosol-generating device may be configured to compare at least one of the determined number of usage sessions, the determined number of charge cycles, and the determined period of time with one or more threshold values indicative of the corresponding maximum values, i.e. the maximum number of usage sessions, the maximum number of charge cycles, and/or the maximum period of time.

Therein, a usage session may, for example, be defined or given by at least one of a period of time during which the aerosol-generating device continuously generates heat or has generated heat, a period of time during which the aerosol-generating device has been active by a user, and a predetermined number of puffs taken by the user on the aerosol-generating device. Accordingly, one or more of the receiving device, the control arrangement of the receiving device, the aerosol-generating device, and the control circuitry of the aerosol-generating device may be configured to determine at least one of the period of time during which the aerosol-generating device continuously generates heat or has generated heat, a period of time during which the aerosol-generating device has been active by a user, and a predetermined number of puffs taken by the user on the aerosol-generating device.

A charge cycle may refer to a period of time, in which the aerosol-generating device is continuously supplied with electrical energy by the receiving device. During a charge cycle, the at least one energy storage may be partly or entirely charged.

For example, the control arrangement of the receiving device may be configured to transmit a locking signal for entering the aerosol-generating device into the locked state to the aerosol-generating device when at least one of the one or more locking conditions is met. Based on, upon receipt and/or in response to receipt of the locking signal at the aerosol-generating, the aerosol-generating device may be switched, entered and/or configured into the locked state.

Accordingly, the locking signal may refer to a control signal for instructing the aerosol-generating device to enter into the locked state.

The aerosol-generating device may further include a data storage and a control circuitry configured to determine, based on the authentication signal received from the receiving device, an authentication indicator and to store the authentication indicator in the data storage. For example, the control circuitry may be configured to derive the authentication indicator from the authentication signal. Therein, the authentication indicator may be indicative, representative and/or descriptive of a successful or an unsuccessful authorization of the user. Alternatively or additionally, the authentication indicator may be indicative, representative and/or descriptive of whether or not the user is authorized to configure the aerosol-generating device, for example into the unlocked state, in which aerosol generation by the aerosol-generating device and/or use of the aerosol-generating device by the user for aerosol consumption can be permitted. Storing the authentication indicator in the data storage of the aerosol-generating may allow to efficiently, reliably and securely configure the aerosol-generating device into the locked state or unlocked state and to at least temporarily retain the aerosol-generating device in the configured locked or unlocked state, for example even when the receiving device is currently not available to the user. Also protection in case of a loss of the aerosol-generating device may be provided.

Generally, the authentication indicator may denote or refer to a data element corresponding to and/or being descriptive of the authentication signal. Accordingly, the authorization indicator may be usable for configuring the aerosol-generating device into the locked state or the unlocked state. In other words, the authentication indicator may refer to a data element allowing to configure and/or being usable for configuring the aerosol-generating device into the locked or unlocked state, to enter the locked or unlocked state, to switch into the locked or unlocked state, and/or to at least temporarily retain the locked or unlocked state. Therein, entering, configuring and/or switching the aerosol-generating device into the locked or unlocked state may mean or comprise actuating and/or configuring the aerosol-generating device, such that the aerosol-generating device is in the locked state or the unlocked state.

For example, the aerosol-generating device may be configured and/or switched into the locked state if or when the authentication indicator is indicative of an unsuccessful authorization of the user, and the aerosol-generating device may be configured and/or switched into the unlocked state if or when the authentication indicator is indicative of a successful authorization of the user. For example, the authentication indicator may refer to a data element, such as a binary data element, wherein a first value may indicate successful authorization of the user at the receiving device and a second value, different than the first value, may indicate unsuccessful authorization of the user at the receiving device. Further, the aerosol-generating device may be configured into the unlocked state if or when the authorization indicator takes the first value and into the locked state if or when the authorization signal takes the second value.

Alternatively or additionally, the aerosol-generating device may be configured into one of the locked and the unlocked state if or when the authorization indicator is present or stored in the data storage of the aerosol-generating device, and configured into the other one of the locked and the unlocked state if or when the authorization indicator is absent in the data storage of the aerosol-generating device.

Accordingly, the authentication indicator may refer to an anonymized data element indicating whether authorization of the user was successful or unsuccessful. Optionally, however, the authorization indicator may be indicative of the one or more biometric features of the user sensed with the at least one biometric sensor, such that the aerosol-generating device can determine whether or not the user is authorized for configuring the aerosol-generating device into the locked or unlocked state, for example based on a comparison of the one or more sensed biometric features with one or more reference biometric features.

Accordingly, the control circuitry of the aerosol-generating device may be configured to enter the aerosol-generating device into the locked state or the unlocked state based on the authentication indicator stored in the data storage of the aerosol-generating device.

In an example, the control circuitry of the aerosol-generating device may be configured to enter the aerosol-generating device into the locked state or the unlocked state based on a value of the authentication indicator stored in the data storage of the aerosol-generating device. For example, a first value of authorization indicator may be associated with the unlocked state and a second value, which differs from the first value, may be associated with the locked state of the aerosol-generating device (or vice versa). Accordingly, when the authorization indicator takes the first value, the aerosol-generating device may be configured into the unlocked state, and when the authorization indicator takes the second value, the aerosol-generating device may be configured into the locked state (or vice versa).

Alternatively or additionally, the control circuitry of the aerosol-generating device may be configured to enter the aerosol-generating device into the locked state or the unlocked state based on a presence and/or an absence of the authentication indicator in the data storage of the aerosol-generating device. For example, the aerosol-generating device may be configured into the locked state, when the authentication indicator is absent from and/or not stored in the data storage of the aerosol-generating device, and the aerosol-generating device may be configured into the unlocked state, when the authentication indicator is present in and/or stored in the data storage of the aerosol-generating device (or vice versa).

Further, the control circuitry of the aerosol-generating device may be configured to modify, adjust, alter and/or change a value of the authentication indicator stored in the data storage of the aerosol-generating device upon successful authentication of the user at the receiving device, such that the aerosol-generating device enters and/or is configured into the unlocked state. In other words, the control circuitry may be configured to configure, enter and/or switch the aerosol-generating device into the unlocked state based on modifying the value of the authentication indicator, for example in correspondence or based on the authentication signal received from the receiving device. Therein, the control circuitry of the aerosol-generating device may be configured to set the authentication indicator to a value, for example the first value, associated with the unlocked state of the aerosol-generating device, such that the aerosol-generating device is configured into the unlocked state.

Alternatively or additionally, the control circuitry of the aerosol-generating device may be configured to set the authentication indicator to a further value, for example the second value, associated with the locked state of the aerosol-generating device, such that the aerosol-generating device is configured into the locked state.

Alternatively or additionally, the control circuitry of the aerosol-generating device may be configured to store the authentication indicator in the data storage only if and/or only when successful authentication of the user at the receiving device is indicated by the authentication signal. Accordingly, the aerosol-generating device may be configured into one of the locked and the unlocked state if and/or when the authentication indicator is stored in the data storage of the aerosol-generating device, and the aerosol-generating device may be configured into the other one of the locked and the unlocked state if and/or when the authentication indicator is not stored or absent in the data storage of the aerosol-generating device state. For example, the control circuitry of the aerosol-generating device may be configured to enter, switch and/or configure the aerosol-generating device into the locked state in absence of the authentication indicator in the data storage of the aerosol-generating device.

Alternatively or additionally, the control circuitry of the aerosol-generating device may be configured to enter, switch and/or configure the aerosol-generating device into the locked state, if or when a value of the authentication indicator in the data storage of the aerosol-generating device takes a predefined value. Therein, the predefined value of the authentication indicator may be associated with the locked state, such as for example the second value of the authentication indicator as described above.

Alternatively or additionally, the control circuitry of the aerosol-generating device may be configured to enter, switch and/or configure the aerosol-generating device into the unlocked state if or when the authentication indicator is stored in the data storage of the aerosol-generating device. In other words, the control circuitry of the aerosol-generating device may be configured to enter, switch and/or configure the aerosol-generating device into the unlocked state in presence of the authentication indicator in the data storage of the aerosol-generating device.

Alternatively or additionally, the control circuitry of the aerosol-generating device may be configured to enter, switch and/or configure the aerosol-generating device into the unlocked state, if or when a value of the authentication indicator in the data storage of the aerosol-generating device takes a further predefined value, which may differ from the predefined value. Therein, the further predefined value of the authentication indicator may be associated with the unlocked state, such as for example the first value of the authentication indicator as described above.

Further, the control circuitry of the aerosol-generating device may be configured to remove, delete and/or erase the authentication indicator from the data storage of the aerosol-generating device, such that the aerosol-generating device is configured into the locked state. In other words, the aerosol-generating device may be configured into the locked state in absence of the authentication indicator in the data storage of the aerosol-generating device and/or based on removing the authentication indicator from the data storage. For example, the control circuitry of the aerosol-generating device may be configured to periodically erase and/or delete the data storage for storing the authentication indicator, such that the aerosol-generating device is periodically configured into the locked state. By periodically removing the authentication indicator from the data storage and/or by periodically erasing the data storage of the aerosol-generating device, the aerosol-generating device can be periodically configured into the locked state. Accordingly, the user may be required to authorize or re-authorize itself periodically, thereby efficiently, reliably and securely preventing use of the aerosol-generating device by an unauthorized user.

Alternatively or additionally, the control circuitry of the aerosol-generating device may be configured to modify, alter, adjust and/or change a value of the authentication indicator, such that the aerosol-generating device is configured into the locked state. Therein, the control circuitry of the aerosol-generating device may be configured to modify, alter, adjust and/or change the value of the authentication indicator to a value associated with the locked state, such as the second value of the authentication indicator. By periodically modifying the value of the authentication indicator, the aerosol-generating device can be periodically configured into the locked state. Accordingly, the user may be required to authorize or re-authorize itself periodically, thereby efficiently, reliably and securely preventing use of the aerosol-generating device by an unauthorized user.

To enter, switch and/or configure the aerosol-generating device into the locked state, the control circuitry of the aerosol-generating device may, for example, be configured to remove, delete and/or erase the authentication indicator from the data storage of the aerosol-generating device based on one or more locking conditions and/or based on determining whether one or more locking conditions are fulfilled.

Alternatively or additionally, to enter, switch and/or configure the aerosol-generating device into the locked state, the control circuitry of the aerosol-generating device may be configured to modify, alter, adjust and/or change the value of the authentication indicator stored in the data storage of the aerosol-generating device based on one or more locking conditions and/or based on determining whether one or more locking conditions are fulfilled. Therein, the control circuitry of the aerosol-generating device may be configured to modify, alter, adjust and/or change the value of the authentication indicator to a value associated with the locked state, such as the second value of the authentication indicator.

Generally, configuring the aerosol-generating device into the locked state based on the one or more locking conditions may allow to automatically and/or periodically configure the aerosol-generating device into the locked state based on the one or more locking conditions. In turn, a user may be required to authorize or re-authorize itself at the aerosol-generating device in dependence of the one or more locking conditions, such that use of the aerosol-generating system or device for aerosol consumption by an unauthorized user can be reliably prohibited and prevented.

The one or more locking conditions may include at least one of and/or may include determining at least one of:
  a maximum number of usage sessions of the aerosol-generating device by the user since a last successful authorization of the user at the receiving device;
  a maximum number of charge cycles performed since the last successful authorization of the user at the receiving device; and
  a maximum period of time expired since the last successful authorization of the user at the receiving device.

Therein, a usage session may, for example, be defined or given by at least one of a period of time during which the aerosol-generating device continuously generates heat or has generated heat, a period of time during which the aerosol-generating device has been active by a user, and a predetermined number of puffs taken by the user on the aerosol-generating device. Accordingly, the control circuitry of the aerosol-generating device may be configured to determine at least one of the period of time during which the aerosol-generating device continuously generates heat or has generated heat, a period of time during which the aerosol-generating device has been active by a user, and a predetermined number of puffs taken by the user on the aerosol-generating device.

Moreover, the communication arrangement of the receiving device may be configured to transmit and/or send the authentication signal to the aerosol-generating device only upon successful authentication of the user at the receiving device. Alternatively or additionally, the authentication signal may be indicative of a successful authentication of the user at the receiving device. Accordingly, the aerosol-generating device may be configured into the unlocked state based on the authentication signal, upon receipt of the authentication signal and/or in response to receipt of the authentication signal.

Further, the authentication signal may be an encrypted signal. For example, a secret or a pass code may be shared between the aerosol-generating device and the receiving device for encrypting the authentication signal. Therein, the secret or pass code may be encoded or included in the authentication signal. Alternatively, the secret or pass code may be transmitted separately from the authentication signal. However, any other encryption approach may be applied to encrypt the authentication signal. Generally, by encrypting the authentication signal, for example an attack of an unauthorized user to configure the aerosol-generating device into the unlocked sate, such as a reply attack, can be reliably prevented. Further, the authentication indicator may be stored in a protected storage area of the data storage of the receiving device and/or the aerosol-generating device.

Further, the aerosol-generating device may include at least one heating element configured to heat an aerosol-generating article to generate the aerosol, wherein the control circuitry of the aerosol-generating device may be configured to prohibit activation of the at least one heating element by the user, when the aerosol-generating device is in the locked state. Moreover, the control circuitry of the aerosol-generating device may be configured to permit activation of the at least one heating element by the user, when the aerosol-generating device is in the unlocked state. By permitting activation of the heating element in the unlocked state and prohibiting activation of the heating element in the locked state, it can be ensured that the user can only use the aerosol-generating device for aerosol consumption upon successful authorization.

By way of example, the control circuitry of the aerosol-generating device may be configured to prohibit activation of the heating element based on at least one of disabling the at least one heating element, disabling an energy supply for supplying electrical energy to the at least one heating element, and disabling an actuation element of the aerosol-generating device for actuating the at least one heating element by the user.

Alternatively or additionally, a flow path of the aerosol through the aerosol-generating device may be blocked in the locked state, and the flow path may be opened or unblocked in the unlocked state. Alternatively or additionally, insertion of an aerosol-generating article into the aerosol-generating device may be prohibited in the locked state, and insertion of the aerosol-generating article may be permitted in the unlocked state. However, any other means for permitting aerosol-generation in the unlocked state and prohibiting aerosol-generation in the locked state may be implemented.

Further, the receiving device may include a data storage for storing at least one age verification indicator, the age verification indicator being indicative of the user reaching or having reached an age threshold. Upon successful authorization of the user at the receiving device, the control arrangement may be further configured to determine and/or verify, based on the age verification indicator, that the user has reached the age threshold. Further, the control arrangement of the receiving device may be configured to transmit the authentication signal to the aerosol-generating device upon or in response to determining and/or verifying that the user has reached the age threshold, for example to configure the aerosol-generating device into the unlocked state. Alternatively or additionally, the control arrangement of the receiving device may be configured to transmit the authentication signal to the aerosol-generating device only if or when the user is verified as having reached the age threshold, for example to configure the aerosol-generating device into the unlocked state.

Alternatively or additionally, the aerosol-generating device may further include a data storage for storing at least one age verification indicator indicative of the user reaching or having reached an age threshold, wherein, upon receipt of the authentication signal, the control circuitry of the aerosol-generating device may be configured to verify and/or determine, based on the age verification indicator, that the user has reached the age threshold. Further, the control circuitry of the aerosol-generating device may be configured to enter, switch and/or configure the aerosol-generating device into the unlocked state only if or when the user is verified as having reached the age threshold.

In the context of the present disclosure, the term age threshold may denote or refer to a predefined and/or predetermined age or minimum age of a user of the aerosol-generating system or device. In certain jurisdictions, for example, aerosol consumption may be permitted for citizens or individuals having reached a certain minimum age and/or having an age equal to or above the minimum age. Further, at least in some jurisdictions, an individual having reached this minimum age may be regarded as being of full age and/or as being an adult. Accordingly, the term age threshold may be indicative, representative, and/or descriptive of a minimum age, a user should have for using the aerosol-generating system or device for aerosol consumption. Alternatively or additionally, the term age threshold may be indicative, representative, and/or descriptive of a majority age, above which the user may be regarded as an adult. For example, the age threshold may range from 14 years to 25 years, such as 16 years, 18 years or 21 years.

Accordingly, the age verification indicator may be usable for and/or may be a data element usable for determining whether the user of the aerosol-generating system has reached the minimum age as indicated by the age threshold. For example, the age verification indicator may be usable for determining whether the user of the aerosol-generating system is of full age, has reached majority age and/or is an adult.

By way of example, the age verification indicator may refer to a flag, a marker, a numerical data element, and/or a binary data element, wherein a first value of the age verification may be indicative of the user not having reached the age threshold and/or indicative of the user having an age below the age threshold. Further, a second value of the age verification indicator, which differs from the first value, may be indicative of the user having reached the age threshold and/or having an age equal to or above the age threshold.

By determining that the user has reached the age threshold based on the age verification indicator stored in the data storage of the receiving device and/or in the data storage of the aerosol-generating device, misuse or legally abusive use of the aerosol-generating system or device for aerosol consumption by a user not having reached the age threshold and/or having an age below the age threshold can be reliably and effectively prohibited. In particular, use of the aerosol-generating system or device for aerosol consumption by an underage user can be reliably and effectively prohibited.

Further, the age verification indicator may be associated with the user. Alternatively or additionally, the age verification indicator may be bound to, tied to, and/or linked with the user. For example, the age verification indicator may be associated with the user based on or during an age verification process, a registration procedure or a set-up procedure, such as an initial age verification process, registration procedure or an initial set-up procedure performed prior to or at a first use of the aerosol-generating system or device by the user.

By way of example, the age verification indicator may be associated with the user based on associating one or more reference biometric features of the user with the age verification indicator. Therein, the one or more reference biometric features may be stored in the data storage of the receiving device and/or the data storage of the aerosol-generating device along with the age verification indicator. Accordingly, the one or more reference biometric features may be stored separately from the age verification indicator in the data storage of the receiving device and/or the data storage of the aerosol-generating device. Alternatively, however, the one or more reference biometric features may be combined with the age verification indicator.

For determining and/or verifying that the user has reached the age threshold, the control arrangement of the receiving device and/or the control circuitry of the aerosol-generating device may be configured to identify, in the data storage, the verification indicator associated with the user, for example based on comparing the at least one biometric feature of the user sensed with the at least one biometric sensor with at least one reference biometric feature of the user stored in the data storage of the receiving device and/or the aerosol-generating device. Alternatively or additionally, the control arrangement and/or the control circuitry may be configured to determine and/or identify at least one reference biometric feature substantially matching the at least one biometric feature of the user sensed with the at least one biometric sensor, thereby determining the age verification indicator associated with the user and/or with said at least one reference biometric feature.

When the age verification indicator indicates that the user has reached the age threshold, the control arrangement of the receiving device may be configured to transmit the authentication signal to the aerosol-generating device, for example to configure the aerosol-generating device into the unlocked state. When the age verification indicator indicates that the user has not reached the age threshold, the control arrangement may be configured to suppress transmission of the authentication signal to the aerosol-generating device, for example such that the aerosol-generating device remains configured in the locked state. Alternatively or additionally, the control circuitry of the receiving device may be configured to switch, enter and/or configure the aerosol-generating device into the unlocked state, when the age verification indicator indicates that the user has reached the age threshold. Further, when the age verification indicator indicates that the user has not reached the age threshold, the control circuitry of the aerosol-generating device may be configured to switch, enter and/or configure the aerosol-generating device into the locked state.

Further, it should be noted that also a plurality of age verification indicators for a plurality of users may be stored in the data storage of the receiving device and/or the aerosol-generating device, wherein for each of the plurality of users at least one biometric feature may be stored in the data storage of the receiving device and/or the aerosol-generating device. Therein, each of the age verification indicators may be associated with one of the plurality of users based on associating said age verification indicator with the at least one biometric feature of said user. For example, each of the users may be required or requested to perform an age verification process, as described in more detail hereinbelow. Alternatively or additionally, one user, for example a master user, may verify an age of a further user and add the further user as authorized and/or age-verified user to the aerosol-generating system.

Further, the receiving device may be configured for being communicatively coupled with a user device of the user, wherein the receiving device may be configured to store the age verification indicator in the data storage of the receiving device upon receipt of an age verification signal from the user device, wherein the age verification signal is indicative of the user reaching the age threshold, having reached the age threshold and/or having an age equal to or above the threshold. In other words, the age verification indicator may be generated based on using a user device communicatively coupled to the receiving device. By means of the user device, a comprehensive and secure procedure to determine the user's age can be implemented, for example based on personal data or information of the user, such as an identity card, a passport, a credit card, a driving license, a social security number of the user, or the like. Hence, the real age of the user can be reliably and unambiguously determined. Moreover, storing a corresponding age verification indicator in the data storage may allow to ensure that the aerosol-generating device can only be configured into the unlocked state and/or can only be used for aerosol consumption by a user having reached the age threshold. In particular, use of the aerosol-generating system or device for aerosol consumption by an underage user can be reliably and effectively prohibited.

In the context of the present disclosure, the user device may refer to a computing device configured to communicate with the aerosol-generating system and/or the receiving device, for example based on exchanging data or information. Generally, the user device may be a handheld or portable device. Alternatively, the user device may be a stand-alone or fixedly installed device. Further, the user device may be in possession of or may be installed at the user or another entity or individual, such as a retail shop. By way of example, the user device may refer to a handheld, a smart phone, a personal computer ("PC"), a tablet PC, a notebook, or a computer.

The user device may comprise a user interface for providing one or more queries to the user and/or for receiving one or more user inputs, such as for example one or more answers to one or more queries.

Further, the user device may comprise a communication interface, communication module and/or communication circuitry for communicatively coupling the user device with the receiving device, for example via the communication interface of the receiving device. Therein, the user device may be configured for wireless communication with the receiving device, for wired communication with the receiving device, or both. For instance, the user device may be configured for being communicatively coupled with the receiving device via an Internet connection, a wireless LAN connection, a WiFi connection, a Bluetooth connection, a mobile phone network, a 3G connection, an edge connection, an LTE connection, a BUS connection, a wireless connection, a wired connection, a radio connection, a near field connection, an IoT connection or any other connection using any appropriate communication protocol.

The user device of the aerosol-generating system may include a user interface and a controller or control circuit configured to determine and/or verify that the user has reached the age threshold based on guiding the user through an age verification process on the user interface. For example, the controller of the user device may be further configured to transmit the age verification signal to the receiving device upon or in response to successful verification that the user has reached the age threshold and/or that the user has an age equal to or above the age threshold.

The controller or control circuit of the user device may comprise one or more processors for data processing, such as for processing one or more user inputs received at the user interface. Alternatively or additionally, the user device may comprise a data storage and/or memory for storing data, such as for example software instructions, a computer program, and/or other data.

For guiding the user through the age verification process, the controller may be configured to provide or output one or more queries and/or one or more requests at the user interface. Further, the controller may be configured to receive and/or process one or more user inputs from the user interface, such as one or more answers or responses to the one or more queries and/or one or more requests.

By way of example, the one or more queries and/or one or more requests may relate to personal information of the user for determining and/or verifying the user's age. Accordingly, the controller may be configured to request personal information or data about the user based on querying the user to provide the requested personal information or data as user input at the user interface. Such personal information or personal data may, for example, relate to, be associated with and/or be indicative of an identity card, a passport, a credit card, a driving license, a social insurance number of the user, or the like. Accordingly, the real age of the user can be reliably and unambiguously determined based on guiding the user through the age verification process, thereby allowing to ensure that the aerosol-generating device can only be configured into the unlocked state and/or can only be used for aerosol consumption by a user having reached the age threshold. In particular, use of the aerosol-generating system or device for aerosol consumption by an underage user can be reliably and effectively prohibited.

Such age verification process may be implemented by means of software instructions or an app stored in the data storage of the user device. Alternatively or additionally, the age verification process may be implemented based on a web interface of the user device coupling the user device to a server, a server network, a further computing device, a cloud computer network, or the like.

Further, the age verification process may refer to a set-up procedure or registration process for setting up the aerosol-generating system, the receiving device and/or the aerosol-generating device. For example, the age verification process may be performed for each user of the aerosol-generating system, for example as an initial age verification process or an initial set-up procedure performed prior to or at a first use of the aerosol-generating system or device by the corresponding user.

Alternatively or additionally, the aerosol-generating device may be set-up only once for a dedicated user, such as a master user, the proprietor or the owner of the aerosol-generating system. This dedicated or master user may add one or more further users as being authorized to use the aerosol-generating system and/or as being age verified (or being verified as having reached the age threshold). For instance, the dedicated or master user may add one or more further users based on one or more user inputs at the user interface of the user device and based on transmitting corresponding information to the aerosol-generating system, the receiving device and/or the aerosol-generating device.

The controller of the user device may further be configured to provide a query to the user at the user interface for requesting the user to acquire, sense, determine and/or store one or more reference biometric features using the at least one biometric sensor of the receiving device. Alternatively or additionally, the controller of the user device may be configured to transmit a control signal to the receiving deice to instruct the receiving device, based on the control signal, to acquire, sense, determine and/or store the one or more reference biometric features using the at least one biometric sensor of the receiving device. For example, the user may be requested to present one or more fingerprints to the at least one biometric sensor, acquire at least one acoustic message with the at least one biometric sensor, acquire one or more images of a face of the user with the at least one biometric sensor, and/or acquire one or more images of an iris of the user.

According to a second aspect of the present disclosure, there is provided a receiving device for an aerosol-generating system, for example the aerosol-generating system according to the first aspect of the present disclosure. Alternatively or additionally, the second aspect of the present disclosure may relate to a receiving device for use with an aerosol-generating system, for use with an aerosol-generating device, for authenticating a user at an aerosol-generating system, and/or for authenticating a user at an aerosol-generating device.

The receiving device according to the second aspect of the present disclosure comprises a communication interface for communicatively coupling the receiving device with an aerosol-generating device of the aerosol-generating system, the aerosol-generating device having a locked state in which the aerosol-generating device is prohibited from generating aerosol and an unlocked state in which the aerosol-generating is permitted to generate aerosol. The receiving device further comprises a control arrangement with at least one biometric sensor configured to authenticate a user of the receiving device based on sensing at least one biometric feature of the user. Therein, the control arrangement is configured to transmit an authentication signal to the aerosol-generating device to configure the aerosol-generating device into the locked state or the unlocked state, the authentication signal being indicative of a successful or an unsuccessful authentication of the user at the receiving device.

As described hereinabove, arranging the at least one biometric sensor at the receiving device may allow to reliably, effectively and securely authenticate the user at minimum modifications for the aerosol-generating device, for instance compared to arranging the at least one biometric sensor at the aerosol-generating device. In particular, by arranging the at least one biometric sensor at the receiving device of the aerosol-generating system no modification of the aerosol-generating device in terms of its an appearance, geometry, shape and design may be Moreover, configuration of the aerosol-generating device into the unlocked state by an unauthorized user can be effectively and reliably be prohibited, such that use of the aerosol-generating system for aerosol consumption by an unauthorized user can be effectively and reliably prohibited.

It is emphasized that any disclosure, presented hereinabove and hereinbelow, which relates, directly or indirectly, to a receiving device, equally applies to the receiving device according to the second aspect of the present disclosure and can be combined therewith (and vice versa).

According to a third aspect of the present disclosure, there is provided an aerosol-generating device for an aerosol-generating system, for example the aerosol-generating system according to the first aspect of the present disclosure. Alternatively or additionally, the third aspect of the present disclosure may relate to an aerosol-generating device for generating an aerosol, for use with an aerosol-generating system, and/or for use with a receiving device of an aerosol-generating system.

The aerosol-generating device according to the third aspect of the present disclosure has a locked state, in which the aerosol-generating device is prohibited from generating aerosol, and an unlocked state, in which the aerosol-generating is permitted to generate aerosol. Therein, the aerosol-generating device comprises a communication interface for communicatively coupling the aerosol-generating device with a receiving device of the aerosol-generating system, wherein the aerosol-generating device is configured to receive, via the communication interface, an authentication signal from the receiving device, the authentication signal being indicative of a successful or an unsuccessful authentication of the user at the receiving device using a biometric sensor at the receiving device. The aerosol-generating device further comprises a control circuitry configured to enter, switch and/or configure the aerosol-generating device into the locked state or the unlocked state based on the authentication signal received from the receiving device.

It is emphasized that any disclosure, presented hereinabove and hereinbelow, which relates, directly or indirectly, to an aerosol-generating device, equally applies to the aerosol-generating device according to the third aspect of the present disclosure and can be combined therewith (and vice versa).

According to a fourth aspect of the present disclosure, there is provided a computer-implemented method of authenticating a user at an aerosol-generating system, for example the aerosol-generating system according to the first aspect of the present disclosure. Therein, the aerosol-generating system includes an aerosol-generating device and a receiving device communicatively couplable with the aerosol-generating device, wherein the aerosol-generating device has a locked state, in which the aerosol-generating device is prohibited from generating aerosol, and an unlocked state, in which the aerosol-generating is permitted to generate aerosol. Alternatively or additionally, the method of the fourth aspect of the present disclosure may relate to a computer-implemented method of authenticating a user at a receiving device for an aerosol-generating system and/or at an aerosol-generating device for an aerosol-generating system. Alternatively or additionally, the method of the fourth aspect may relate to a method of operating one or more of the aerosol-generating system, aerosol-generating device, and the receiving device.

The method according to the fourth aspect comprises:
sensing, with a biometric sensor arranged at the receiving device, at least one biometric feature of the user to authenticate the user;
generating, at the receiving device, an authentication signal indicative of a successful or an unsuccessful authentication of the user at the receiving device; and
transmitting the authentication signal to the aerosol-generating device, thereby configuring and/or to configure the aerosol-generating device into the locked state or the unlocked state based on the authentication signal.

It is emphasized that any disclosure, presented hereinabove and hereinbelow, which relates, directly or indirectly, to an aerosol-generating device, a receiving device and an aerosol-generating system, equally applies to the method according to the fourth aspect of the present disclosure and can be combined therewith (and vice versa).

The method may further comprise configuring, switching and/or entering the aerosol-generating device into the locked state based on one or more locking conditions. Alternatively or additionally, the method may further comprise configuring, switching and/or entering the aerosol-generating device into the locked state based on determining, at the receiving device and/or at the aerosol-generating device, one or more locking conditions.

As described hereinabove, determining the one or more locking conditions may include determining at least one of a maximum number of usage sessions of the aerosol-generating device by the user since the last successful authorization of the user at the receiving device, a maximum number of charge cycles performed since the last successful authorization of the user at the receiving device, and a maximum period of time expired since the last successful authorization of the user at the receiving device. For example, a usage session may be defined by at least one of a period of time during which the aerosol-generating device continuously generates heat, a period of time during which the aerosol-generating device has been active by a user; and a predetermined number of puffs taken by the user on the aerosol-generating device.

The method may further comprise determining, at the aerosol-generating device based on the authentication signal received from the receiving device, an authentication indicator and storing the authentication indicator in a data storage of the aerosol-generating device.

The method may further comprise entering the aerosol-generating device into the locked state or the unlocked state based on the authentication indicator.

The method may further comprise receiving, at the receiving device, an age verification signal from a user device communicatively couplable with the receiving device, wherein the age verification signal is indicative of the user reaching an age threshold. The method may further comprise verifying, at the receiving device based on the received age verification signal, that the user has reached the age threshold. For example, the authentication signal may only be transmitted to the aerosol-generating device if the user is verified as having reached the age threshold.

The method may further comprise determining, at the receiving device based on the received age verification signal, an age verification indicator, and storing the age verification indicator in a data storage of the receiving device. Optionally, the age verification indicator may be stored in a data storage of the aerosol-generating device, for example based on transmitting the age verification indicator from the receiving to the aerosol-generating device.

The method may further comprise guiding a user through an age verification process on a user interface of user device communicatively couplable to the receiving device, thereby verifying that the user has reached the age threshold. The method may further comprise transmitting the age verification signal from the user device to the receiving device upon successful verification, at the receiving device, that the user has reached the age threshold.

According to a fifth aspect of the present disclosure, there is provided a computer program, which, when executed by one or more processors of one or more of an aerosol-generating system, a receiving device and an aerosol-generating device, instructs one or more of the aerosol-generating system, the receiving device, and the aerosol-generating device to perform or carry out steps of the method according to the fourth aspect of the present disclosure.

According to a sixth aspect of the present disclosure, there is provided a non-transitory computer-readable medium having stored thereon the computer program according to the fifth aspect of the present disclosure.

A seventh aspect of the present disclosure relates to a use of a biometric sensor at or arranged at a receiving device of an aerosol-generating system for authenticating a user of the aerosol-generating system and/or for configuring an aerosol-generating device of the aerosol-generating system, which has a locked state and an unlocked state, into the locked or unlocked state based on transmitting an authentication signal from the receiving device to the aerosol-generating device, wherein the authentication signal is indicative of a successful or unsuccessful authentication of the user at the receiving device.

According to an eighth aspect of the present disclosure, there is provided a user device for configuring an aerosol-generating system, a receiving device for an aerosol-generating system and/or an aerosol-generating device for an aerosol-generating system. Therein, the aerosol-generating system may include the aerosol-generating device and the receiving device, which may be communicatively couplable with the aerosol-generating device. Further, the aerosol-generating device may have a locked state, in which the aerosol-generating device may be prohibited from generating aerosol, and an unlocked state, in which the aerosol-generating may be permitted to generate aerosol.

The user device according to the eighth aspect of the present disclosure comprises a user interface configured to receive a user input and/or to guide the user through an age verification process. The user device further comprises a controller configured to determine and/or verify that the user has reached an age threshold based on guiding the user through the age verification process on the user interface, wherein the controller is further configured to transmit an age verification signal to the receiving device upon successful verification that the user has reached the age threshold, wherein the age verification signal is indicative of the user having reached the age threshold.

It is emphasized that any disclosure, presented hereinabove and hereinbelow, which relates, directly or indirectly, to a user device, equally applies to the user device according to the eighth aspect of the present disclosure and can be combined therewith (and vice versa).

As described hereinabove, by means of the user device, a comprehensive and secure procedure to determine the user's age can be implemented, for example based on personal data or information of the user, such as an identity card, a passport, a credit card, a driving license, a social security number of the user, or the like. Hence, the real age of the user can be reliably and unambiguously determined, and for example use of the aerosol-generating system or device for aerosol consumption by an underage user can be reliably and effectively prohibited.

Further, the user device may refer to a computing device configured to communicate with the aerosol-generating system and/or the receiving device, for example based on exchanging data or information. Generally, the user device may be a handheld or portable device. Alternatively, the user device may be a stand-alone or fixedly installed device.

Further, the user device may be in possession of or may be installed at the user or another entity or individual, such as a retail shop. By way of example, the user device may refer to a handheld, a smart phone, a personal computer ("PC"), a tablet PC, a notebook, or a computer. The user device may comprise a user interface for providing one or more queries to the user and/or for receiving one or more user inputs, such as for example one or more answers to one or more queries.

Further, the user device may comprise a communication interface, communication module and/or communication circuitry for communicatively coupling the user device with the receiving device, for example via the communication interface of the receiving device. Therein, the user device may be configured for wireless communication with the receiving device, for wired communication with the receiving device, or both. For instance, the user device may be configured being communicatively coupled with the receiving device via an Internet connection, a wireless LAN connection, a WiFi connection, a Bluetooth connection, a mobile phone network, a 3G connection, an edge connection, an LTE connection, a BUS connection, a wireless connection, a wired connection, a radio connection, a near field connection, an IoT connection or any other connection using any appropriate communication protocol.

The controller of the user device may be configured to instruct the receiving device, based on the age verification signal, to determine at least one age verification indicator indicative of the user having reached the age threshold.

Alternatively or additionally, the controller of the user device may be configured to instruct the receiving device to store the at least one age verification indicator in a data storage of the receiving device and/or in a data storage of the aerosol-generating device, for example based on instructing the receiving device to transmit the age verification indicator and/or the age verification signal to the aerosol-generating device.

The user device may include a user interface and a controller or control circuit configured to determine and/or verify that the user has reached the age threshold based on guiding the user through an age verification process on the user interface. For example, the controller of the user device may be further configured to transmit the age verification signal to the receiving device upon or in response to successful verification that the user has reached the age threshold and/or that the user has an age equal to or above the age threshold.

The controller of the user device may comprise one or more processors for data processing, such as for processing one or more user inputs received at the user interface. Alternatively or additionally, the user device may comprise a data storage and/or memory for storing data, such as for example software instructions, a computer program, and/or other data.

For guiding the user through the age verification process, the controller may be configured to provide or output one or more queries and/or one or more requests at the user interface. Further, the controller may be configured to receive and/or process one or more user inputs from the user interface, such as one or more answers or responses to the one or more queries and/or one or more requests.

By way of example, the one or more queries and/or one or more requests may relate to personal information of the user for determining and/or verifying the user's age. Accordingly, the controller may be configured to request personal information or data about the user based on querying the user to provide the requested personal information or data as user input at the user interface. Such personal information or personal data may, for example, relate to, be associated with and/or be indicative of an identity card, a passport, a credit card, a driving license, a social insurance number of the user, or the like. Accordingly, the real age of the user can be reliably and unambiguously determined based on guiding the user through the age verification process, thereby allowing to ensure that the aerosol-generating device can only be configured into the unlocked state and/or can only be used for aerosol consumption by a user having reached the age threshold. In particular, use of the aerosol-generating system or device for aerosol consumption by an underage user can be reliably and effectively prohibited.

Such age verification process may be implemented by means of software instructions or an app stored in the data storage of the user device. Alternatively or additionally, the age verification process may be implemented based on a web interface of the user device to a server, a server network, a further computing device, a cloud computer network, or the like.

Further, the age verification process may refer to a set-up procedure or registration procedure for setting up the aerosol-generating system, the receiving device and/or the aerosol-generating device. For example, the age verification process may be performed for each user of the aerosol-generating system, for example as an initial age verification process or an initial set-up procedure performed prior to or at a first use of the aerosol-generating system or device by the corresponding user.

Alternatively or additionally, the aerosol-generating device may be set-up only once for a dedicated user, such as a master user, the proprietor or the owner of the aerosol-generating system. This dedicated or master user may add one or more further users as being authorized to use the aerosol-generating system and/or as being age verified (or being verified as having reached the age threshold). For instance, the dedicated or master user may add one or more further users based on one or more user inputs at the user interface of the user device and based on transmitting corresponding information to the aerosol-generating system, the receiving device and/or the aerosol-generating device.

The controller of the user device may further be configured to provide a query to the user at the user interface for requesting the user to acquire, sense, determine and/or store one or more reference biometric features using the at least one biometric sensor of the receiving device. Alternatively or additionally, the controller of the user device may be configured to transmit a control signal to the receiving deice to instruct the receiving device, based on the control signal, to acquire, sense, determine and/or store the one or more reference biometric features using the at least one biometric sensor of the receiving device. For example, the user may be requested to present one or more fingerprints to the at least one biometric sensor, acquire at least one acoustic message with the at least one biometric sensor, acquire one or more images of a face of the user with the at least one biometric sensor, and/or acquire one or more images of an iris of the user.

According to a ninth aspect of the present disclosure, there is provided a computer-implemented method of operating and/or registering a user device for configuring an aerosol-generating system, a receiving device for an aerosol-generating system and/or an aerosol-generating device for an aerosol-generating system. For example, the user device may refer to the user device according to the eighth aspect of the present disclosure. Therein, the aerosol-generating system may include the aerosol-generating device and the receiving device, which may be communicatively couplable with the aerosol-generating device. Further, the aerosol-generating device may have a locked state, in which the aerosol-generating device may be prohibited from generating aerosol, and an unlocked state, in which the aerosol-generating may be permitted to generate aerosol.

The method according to the ninth aspect of the present disclosure comprises:
- guiding, at a user interface of the user device, a user of the user device through an age verification process;
- verifying, at the user device, that the user has reached an age threshold; and
- transmitting an age verification signal from the user device to the receiving device upon verifying that the user has reached the age threshold, wherein the age verification signal is indicative of the user having reached the age threshold.

It is emphasized that any disclosure, presented hereinabove and hereinbelow, which relates, directly or indirectly, to a user device, equally applies to the method according to the ninth aspect of the present disclosure and can be combined therewith (and vice versa).

The method may further comprise instructing, based on the age authentication signal, the receiving device to determine at least one age verification indicator indicative of the user having reached the age threshold.

Alternatively or additionally, the method may comprise instructing the receiving device to store the at least one age verification indicator in a data storage of the receiving device and/or in a data storage of the aerosol-generating device, for example based on instructing the receiving device to transmit the age verification indicator and/or the age verification signal to the aerosol-generating device.

Further, guiding the user through the age verification process may comprise providing one or more queries and/or one or more requests at the user interface. Alternatively or additionally, the method may comprise receiving and/or processing one or more user inputs from the user interface, such as one or more answers or responses to the one or more queries and/or one or more requests.

For example, the method may further comprise providing a query to the user at the user interface for requesting the user to acquire, sense, determine and/or store one or more reference biometric features using the at least one biometric sensor of the receiving device. Alternatively or additionally, the method may further comprise transmitting a control signal to the receiving device, thereby instructing the receiving device, based on the control signal, to acquire, sense, determine and/or store the one or more reference biometric features using the at least one biometric sensor of the receiving device. For example, the user may be requested to present one or more fingerprints to the at least one biometric sensor, acquire at least one acoustic message with the at least one biometric sensor, acquire one or more images of a face of the user with the at least one biometric sensor, and/or acquire one or more images of an iris of the user.

According to a tenth aspect of the present disclosure, there is provided a computer program, which, when executed by one or more processors of a user device, instructs the user device to perform or carry out steps of the method according to the ninth aspect of the present disclosure.

According to an eleventh aspect of the present disclosure, there is provided a non-transitory computer-readable medium having stored thereon the computer program according to the tenth aspect of the present disclosure.

Below, there is provided a non-exhaustive list of non-limiting examples. Any one or more of the features of these examples may be combined with any one or more features of another example, embodiment, or aspect described herein.

A.1: An aerosol-generating system, comprising:
- an aerosol-generating device configured to generate aerosol, the aerosol-generating device having a locked state in which the aerosol-generating device is prohibited from generating aerosol and an unlocked state in which the aerosol-generating device is permitted to generate aerosol; and
- a receiving device configured to at least partially receive the aerosol-generating device.

Therein, each of the aerosol-generating device and the receiving device includes a communication interface for communicatively coupling the aerosol-generating device with the receiving device, wherein the receiving device includes a control arrangement with at least one biometric sensor configured to authenticate a user of the aerosol-generating system based on sensing at least one biometric feature of the user, and wherein the control arrangement is configured to transmit an authentication signal to the aerosol-generating device to configure the aerosol-generating device into the locked state or the unlocked state, the authentication signal being indicative of a successful or an unsuccessful authentication of the user at the receiving device.

B.1: The system according to example A.1, wherein the at least one biometric sensor is at least one of a fingerprint sensor, an iris recognition sensor, a voice recognition sensor, and a camera for face recognition.

C.1: The system according to any of examples A.1 to B.1, wherein the aerosol-generating device includes at least one energy storage for storing electrical energy, and wherein the receiving device is configured to supply electrical energy to the aerosol-generating device to charge the at least one energy storage of the aerosol-generating device.

D.1: The system according to any of examples A.1 to C.1, wherein the aerosol-generating system is configured to enter the aerosol-generating device into the locked state based on one or more locking conditions.

E.1: The system according to any of examples A.1 to D.1, wherein the one or more locking conditions include determining at least one of:
- a maximum number of usage sessions of the aerosol-generating device by the user since the last successful authorization of the user at the receiving device,
- a maximum number of charge cycles performed since the last successful authorization of the user at the receiving device, and
- a maximum period of time expired since the last successful authorization of the user at the receiving device.

F.1: The system according to any of examples A.1 to E.1, wherein a usage session is defined by at least one of:
- a period of time during which the aerosol-generating device continuously generates heat;
- a period of time during which the aerosol-generating device has been active by a user; and
- a predetermined number of puffs taken by the user on the aerosol-generating device.

G.1: The system according to any of examples A.1 to F.1, wherein the aerosol-generating device further includes:
- a data storage; and
- a control circuitry configured to determine, based on the authentication signal received from the receiving device, an authentication indicator and to store the authentication indicator in the data storage.

H.1: The system according to any of examples A.1 to F.1, wherein the control circuitry of the aerosol-generating device is configured to enter the aerosol-generating device into the locked state or the unlocked state based on the authentication indicator stored in the data storage of the aerosol-generating device.

I.1: The system according to any of examples A.1 to H.1, wherein the control circuitry of the aerosol-generating device is configured to enter the aerosol-generating device into the locked state or the unlocked state based on a value of the authentication indicator stored in the data storage of the aerosol-generating device.

J.1: The system according to any of examples A.1 to I.1, wherein the control circuitry of the aerosol-generating device is configured to modify a value of the authentication indicator stored in the data storage of the aerosol-generating device upon successful authentication of the user at the receiving device, such that the aerosol-generating device is configured into the unlocked state.

K.1: The system according to any of examples A.1 to J.1, wherein the control circuitry of the aerosol-generating device is configured to store the authentication indicator in the data storage only if successful authentication of the user at the receiving device is indicated by the authentication signal.

L.1: The system according to any of examples A.1 to K.1, wherein the control circuitry of the aerosol-generating device is configured to enter the aerosol-generating device into the locked state in absence of the authentication indicator in the data storage of the aerosol-generating device, and/or wherein the control circuitry of the aerosol-generating device is configured to enter the aerosol-generating device into the locked state, when a value of the authentication indicator in the data storage of the aerosol-generating device takes a predefined value.

M.1: The system according to any of examples A.1 to L.1, wherein the control circuitry of the aerosol-generating device is configured to enter the aerosol-generating device into the unlocked state if the authentication indicator is stored in the data storage of the aerosol-generating device; and/or wherein the control circuitry of the aerosol-generating device is configured to enter the aerosol-generating device into the unlocked state, when a value of the authentication indicator in the data storage of the aerosol-generating device takes a further predefined value.

N.1: The system according to any of examples A.1 to M.1, wherein the control circuitry of the aerosol-generating device is configured to remove the authentication indicator from the data storage of the aerosol-generating device, such that the aerosol-generating device is configured into the locked state, and/or wherein the control circuitry of the aerosol-generating device is configured to modify a value of the authentication indicator, such that the aerosol-generating device is configured into the locked state.

O.1: The system according to any of examples A.1 to M.1, wherein the control circuitry of the aerosol-generating device is configured to periodically erase the data storage for storing the authentication indicator, such that the aerosol-generating device is periodically configured into the locked state, and/or wherein the control circuitry of the aerosol-generating device is configured to periodically modify a value of the authentication indicator stored in the data storage, such that the aerosol-generating device is periodically configured into the locked state.

P.1: The system according to any of examples A.1 to O.1, wherein, to enter the aerosol-generating device into the locked state, the control circuitry of the aerosol-generating device is configured to remove the authentication indicator from the data storage of the aerosol-generating device based on one or more locking conditions; and/or wherein, to enter the aerosol-generating device into the locked state, the control circuitry of the aerosol-generating device is configured to modify the value of the authentication indicator stored in the data storage of the aerosol-generating device based on one or more locking conditions.

Q.1: The system according to any of examples A.1 to P.1, wherein the one or more locking conditions include determining at least one of:
   a maximum number of usage sessions of the aerosol-generating device by the user since the last successful authorization of the user at the receiving device,
   a maximum number of charge cycles performed since the last successful authorization of the user at the receiving device, and
   a maximum period of time expired since the last successful authorization of the user at the receiving device.

R.1: The system according to any of examples A.1 to Q.1, wherein a usage session is defined by at least one of:
   a period of time during which the aerosol-generating device continuously generates heat;
   a period of time during which the aerosol-generating device has been active by a user; and
   a predetermined number of puffs taken by the user on the aerosol-generating device.

S.1: The system according to any of examples A.1 to R.1, wherein the communication arrangement of the receiving device is configured to transmit the authentication signal to the aerosol-generating device only upon successful authentication of the user at the receiving device; and/or wherein the authentication signal is indicative of successful authentication of the user at the receiving device.

T.1: The system according to any of examples A.1 to S.1, wherein the authentication signal is an encrypted signal.

U.1: The system according to any of examples A.1 to T.1, wherein the aerosol-generating device includes at least one heating element configured to heat an aerosol-generating article to generate the aerosol, wherein the control circuitry of the aerosol-generating device is configured to prohibit activation of the at least one heating element when the aerosol-generating device is in the locked state, and wherein the control circuitry of the aerosol-generating device is configured to permit activation of the at least one heating element when the aerosol-generating device is in the unlocked state.

V.1: The system according to any of examples A.1 to U.1, wherein the control circuitry of the aerosol-generating device is configured to prohibit activation of the heating element based on at least one of disabling the at least one heating element, disabling an energy supply for supplying electrical energy to the at least one heating element; and disabling an actuation element of the aerosol-generating device for actuating the at least one heating element by the user.

W.1: The system according to any of examples A.1 to V.1, wherein the at least one biometric sensor is arranged on a side wall of the receiving device.

X.1: The system according to any of examples A.1 to W.1, wherein the aerosol-generating device and the receiving device each include an electrical connector for electrically coupling the receiving device with the aerosol-generating device, when the aerosol-generating device is at least partially received in the receiving device.

Y.1: The system according to any of examples A.1 to X.1, wherein each of the communication interface of the receiving device and the communication interface of the aerosol-generating device is configured for wireless communication between the receiving device and the aerosol-generating device.

Z.1: The system according to any of examples A.1 to Y.1, wherein each of the communication interface of the receiving device and the communication interface of the aerosol-generating device is configured for wired communication between the receiving device and the aerosol-generating device.

AA.1: The system according to any of examples A.1 to Z.1, wherein the receiving device further includes a data storage for storing at least one age verification indicator indicative of the user reaching an age threshold; and wherein, upon successful authorization of the user at the receiving device, the control arrangement is configured to determine, based on the age verification indicator, that the user has reached the age threshold; and herein the control arrangement of the receiving device is configured to transmit the authentication signal to the aerosol-generating device upon determining that the user has reached the age threshold.

AB.1: The system according to any of examples A.1 to AA.1, wherein the receiving device is further configured for being communicatively coupled with a user device of the user; and wherein the receiving device is configured to store the age verification indicator in the data storage of the receiving device upon receipt of an age verification signal from the user device, wherein the age verification signal is indicative of the user reaching the age threshold.

AC.1: The system according to any of examples A.1 to AB.1, further comprising:
  a user device communicatively coupled with the receiving device, wherein the user device includes a user interface and a controller configured to verify that the user has reached the age threshold based on guiding the user through an age verification process on the user interface, and wherein the controller is configured to transmit the age verification signal to the receiving device upon successful verification that the user has reached the age threshold.

A.2: A receiving device for an aerosol-generating system, the receiving device comprising:
  a communication interface for communicatively coupling the receiving device with an aerosol-generating device of the aerosol-generating system, the aerosol-generating device having a locked state in which the aerosol-generating device is prohibited from generating aerosol and an unlocked state in which the aerosol-generating device is permitted to generate aerosol; and
  a control arrangement with at least one biometric sensor configured to authenticate a user of the receiving device based on sensing at least one biometric feature of the user, wherein the control arrangement is configured to transmit an authentication signal to the aerosol-generating device to configure the aerosol-generating device into the locked state or the unlocked state, the authentication signal being indicative of a successful or an unsuccessful authentication of the user at the receiving device.

B.2: The receiving device according to example A.2, wherein the at least one biometric sensor is at least one of a fingerprint sensor, an iris recognition sensor, a voice recognition sensor, and a camera for face recognition.

C.2: The receiving device according to any of examples A.2 to B.2, wherein the receiving device is configured to supply electrical energy to the aerosol-generating device to charge at least one energy storage of the aerosol-generating device.

D.2: The receiving device according to any of examples A.2 to C.2, wherein the receiving device is configured to enter the aerosol-generating device into the locked state based on one or more locking conditions.

E.2: The receiving device according to any of examples A.2 to D.2, wherein the one or more locking conditions include determining at least one of:
  a maximum number of usage sessions of the aerosol-generating device by the user since the last successful authorization of the user at the receiving device,
  a maximum number of charge cycles performed since the last successful authorization of the user at the receiving device, and
  a maximum period of time expired since the last successful authorization of the user at the receiving device.

F.2: The receiving device according to any of examples A.2 to E.2, wherein a usage session is defined by at least one of:
  a period of time during which the aerosol-generating device continuously generates heat;
  a period of time during which the aerosol-generating device has been active by a user; and
  a predetermined number of puffs taken by the user on the aerosol-generating device.

G.2: The receiving device according to any of examples A.2 to F.2, wherein the control arrangement is configured to transmit a locking signal for entering the aerosol-generating device into the locked state to the aerosol-generating device when at least one of the one or more locking conditions is met.

H.2: The receiving device according to any of examples A.2 to G.2, wherein the communication arrangement is configured to transmit the authentication signal to the aerosol-generating device only upon successful authentication of the user at the receiving device; and/or wherein the authentication signal is indicative of the successful authentication of the user at the receiving device.

I.2: The receiving device according to any of examples A.2 to H.2, wherein the authentication signal is an encrypted signal.

J.2: The receiving device according to any of examples A.2 to I.2, wherein the at least one biometric sensor is arranged on a side wall of the receiving device.

K.2: The receiving device according to any of examples A.2 to J.2, wherein the receiving device further includes a data storage for storing at least one age verification indicator indicative of the user reaching an age threshold; and wherein, upon successful authorization of the user at the receiving device, the control arrangement is configured to determine, based on the age verification indicator, that the user has reached the age threshold; and wherein the control arrangement of the receiving device is configured to transmit the authentication signal to the aerosol-generating device upon determining that the user has reached the age threshold.

L.2: The receiving device according to any of examples A.2 to K.2, wherein the receiving device is further configured for being communicatively coupled with a user device of the user; and wherein the control arrangement of the receiving device is configured to store the age verification indicator in the data storage of the receiving device upon receipt of an age verification signal from the user device, wherein the age verification signal is indicative of the user reaching the age threshold.

A.3: An aerosol-generating device for an aerosol-generating system, wherein the aerosol-generating device has a locked state in which the aerosol-generating device is prohibited from generating aerosol and an unlocked state in which the aerosol-generating is permitted to generate aerosol, the aerosol-generating device comprising:
- a communication interface for communicatively coupling the aerosol-generating device with a receiving device of the aerosol-generating system, wherein the aerosol-generating device is configured to receive, via the communication interface, an authentication signal from the receiving device, the authentication signal being indicative of a successful or an unsuccessful authentication of the user at the receiving device using a biometric sensor at the receiving device; and
- a control circuitry configured to enter the aerosol-generating device into the locked state or the unlocked state based on the authentication signal received from the receiving device.

B.3: The aerosol-generating device according to example A.3, wherein the aerosol-generating device includes at least one energy storage for storing electrical energy and configured for being charged by the receiving device.

C.3: The aerosol-generating device according to any of examples A.3 to B.3, wherein the aerosol-generating system is configured to enter the aerosol-generating device into the locked state based on one or more locking conditions.

D.3: The aerosol-generating device according to any of examples A.3 to C.3, wherein the one or more locking conditions include determining at least one of:
- a maximum number of usage sessions of the aerosol-generating device by the user since the last successful authorization of the user at the receiving device,
- a maximum number of charge cycles performed since the last successful authorization of the user at the receiving device, and
- a maximum period of time expired since the last successful authorization of the user at the receiving device.

E.3: The aerosol-generating device according to any of examples A.3 to D.3, wherein a usage session is defined by at least one of:
- a period of time during which the aerosol-generating device continuously generates heat;
- a period of time during which the aerosol-generating device has been active by a user; and
- a predetermined number of puffs taken by the user on the aerosol-generating device.

F.3: The aerosol-generating device according to any of examples A.3 to E.3, further including a data storage, wherein the control circuitry is configured to determine, based on the authentication signal received from the receiving device, an authentication indicator and to store the authentication indicator in the data storage.

G.3: The aerosol-generating device according to any of examples A.3 to F.3, wherein the control circuitry of the aerosol-generating device is configured to enter the aerosol-generating device into the locked state or the unlocked state based on the authentication indicator stored in the data storage of the aerosol-generating device.

H.3: The aerosol-generating device according to any of examples A.3 to G.3, wherein the control circuitry of the aerosol-generating device is configured to enter the aerosol-generating device into the locked state or the unlocked state based on a value of the authentication indicator stored in the data storage of the aerosol-generating device.

I.3: The aerosol-generating device according to any of examples A.3 to H.3, wherein the control circuitry of the aerosol-generating device is configured to modify a value of the authentication indicator stored in the data storage of the aerosol-generating device upon successful authentication of the user at the receiving device, such that the aerosol-generating device is configured into the unlocked state.

J.3: The aerosol-generating device according to any of examples A.3 to I.3, wherein the control circuitry of the aerosol-generating device is configured to store the authentication indicator in the data storage only if successful authentication of the user at the receiving device is indicated by the authentication signal.

K.3: The aerosol-generating device according to any of examples A.3 to J.3, wherein the control circuitry of the aerosol-generating device is configured to enter the aerosol-generating device into the locked state in absence of the authentication indicator in the data storage of the aerosol-generating device; and/or wherein the control circuitry of the aerosol-generating device is configured to enter the aerosol-generating device into the locked state, when a value of the authentication indicator in the data storage of the aerosol-generating device takes a predefined value.

L.3: The aerosol-generating device according to any of examples A.3 to K.3, wherein the control circuitry of the aerosol-generating device is configured to enter the aerosol-generating device into the unlocked state if the authentication indicator is stored in the data storage of the aerosol-generating device; and/or wherein the control circuitry of the aerosol-generating device is configured to enter the aerosol-generating device into the unlocked state, when a value of the authentication indicator in the data storage of the aerosol-generating device takes a further predefined value.

M.3: The aerosol-generating device according to any of examples A.3 to L.3, wherein the control circuitry of the aerosol-generating device is configured to remove the authentication indicator from the data storage of the aerosol-generating device, such that the aerosol-generating device is configured into the locked state; and/or wherein the control circuitry of the aerosol-generating device is configured to modify a value of the authentication indicator, such that the aerosol-generating device is configured into the locked state.

N.3: The aerosol-generating device according to any of examples A.3 to M.3, wherein the control circuitry of the aerosol-generating device is configured to periodically erase the data storage for storing the authentication indicator, such that the aerosol-generating device is periodically configured into the locked state; and/or wherein the control circuitry of the aerosol-generating device is configured to periodically modify a value of the authentication indicator stored in the data storage, such that the aerosol-generating device is periodically configured into the locked state.

O.3: The aerosol-generating device according to any of examples A.3 to N.3, wherein, to enter the aerosol-generating device into the locked state, the control circuitry of the aerosol-generating device is configured to remove the authentication indicator from the data storage of the aerosol-generating device based on one or more locking conditions; and/or wherein, to enter the aerosol-generating device into the locked state, the control circuitry of the aerosol-generating device is configured to modify the value of the authentication indicator stored in the data storage of the aerosol-generating device based on one or more locking conditions.

P.3: The aerosol-generating device according to any of examples A.3 to O.3, wherein the one or more locking conditions include determining at least one of:

a maximum number of usage sessions of the aerosol-generating device by the user since the last successful authorization of the user at the receiving device,
a maximum number of charge cycles performed since the last successful authorization of the user at the receiving device, and
a maximum period of time expired since the last successful authorization of the user at the receiving device.

Q.3: The aerosol-generating device according to any of examples A.3 to P.3, wherein a usage session is defined by at least one of:
a period of time during which the aerosol-generating device continuously generates heat;
a period of time during which the aerosol-generating device has been active by a user; and
a predetermined number of puffs taken by the user on the aerosol-generating device.

R.3: The aerosol-generating device according to any of examples A.3 to Q.3, wherein the aerosol-generating device includes at least one heating element configured to heat an aerosol-generating article to generate the aerosol; wherein the control circuitry of the aerosol-generating device is configured to prohibit activation of the at least one heating element when the aerosol-generating device is in the locked state; and wherein the control circuitry of the aerosol-generating device is configured to permit activation of the at least one heating element when the aerosol-generating device is in the unlocked state.

S.3: The aerosol-generating device according to any of examples A.3 to R.3, wherein the control circuitry is configured to prohibit activation of the heating element based on at least one of disabling the at least one heating element, disabling an energy supply for supplying electrical energy to the at least one heating element; and disabling an actuation element of the aerosol-generating device for actuating the at least one heating element by the user.

T.3: The aerosol-generating device according to any of examples A.3 to S.3, wherein the aerosol-generating device further includes a data storage for storing at least one age verification indicator indicative of the user reaching an age threshold; and wherein, upon receipt of the authentication signal, the control circuitry is configured to determine, based on the age verification indicator, that the user has reached the age threshold and to enter the aerosol-generating device into the unlocked state upon determining that the user has reached the age threshold.

A.4: A computer-implemented method of authenticating a user at an aerosol-generating system, a receiving device and/or aerosol-generating device, the aerosol-generating device and a receiving device being communicatively couplabe with each other, and the aerosol-generating device having a locked state in which the aerosol-generating device is prohibited from generating aerosol and an unlocked state in which the aerosol-generating device is permitted to generate aerosol, the method comprising:
sensing, with a biometric sensor arranged at the receiving device, at least one biometric feature of the user to authenticate the user;
generating, at the receiving device, an authentication signal indicative of a successful or an unsuccessful authentication of the user at the receiving device; and
transmitting the authentication signal to the aerosol-generating device, thereby configuring the aerosol-generating device into the locked state or the unlocked state based on the authentication signal.

B.4: The method of example A.4, further comprising configuring the aerosol-generating device into the locked state based on one or more locking conditions.

C.4: The method of any of examples A.4 to B.4, wherein the one or more locking conditions include determining at least one of:
a maximum number of usage sessions of the aerosol-generating device by the user since the last successful authorization of the user at the receiving device,
a maximum number of charge cycles performed since the last successful authorization of the user at the receiving device, and
a maximum period of time expired since the last successful authorization of the user at the receiving device.

D.4: The method of any of examples A.4 to C.4, wherein a usage session is defined by at least one of:
a period of time during which the aerosol-generating device continuously generates heat;
a period of time during which the aerosol-generating device has been active by a user; and
a predetermined number of puffs taken by the user on the aerosol-generating device.

E.4: The method of any of examples A.4 to D.4, further comprising:
determining, at the aerosol-generating device based on the authentication signal received from the receiving device, an authentication indicator and storing the authentication indicator in a data storage of the aerosol-generating device; and
entering the aerosol-generating device into the locked state or the unlocked state based on the authentication indicator.

F.4: The method of any of examples A.4 to E.4, further comprising:
receiving, at the receiving device, an age verification signal from a user device communicatively couplable with the receiving device, wherein the age verification signal is indicative of the user reaching an age threshold; and
determining, at the receiving device based on the received age verification signal, that the user has reached the age threshold.

G.4: The method of any of examples A.4 to F.4, wherein the authentication signal is only transmitted to the aerosol-generating device if the user is verified as having reached the age threshold.

H.4: The method of any of examples A.4 to G.4, further comprising determining, based on the received age verification signal, an age verification indicator; and/or storing the age verification indicator in a data storage of the receiving device.

I.4: The method of any of examples A.4 to H.4, wherein the aerosol-generating system further includes a user device communicatively couplable with the receiving device, the method further comprising:
guiding a user through an age verification process on a user interface of the user device, thereby verifying that the user has reached the age threshold; and
transmitting the age verification signal from the user device to the receiving device upon successful verification that the user has reached the age threshold.

A.5: A computer program, which when executed by one or more processors of an aerosol-generating system, an aerosol-generating device and/or a receiving device, instructs the aerosol-generating system, the aerosol-generating device and/or the receiving device to perform steps of the method according to any of examples A.4 to I.4.

A.6: A non-transitory computer-readable medium storing the computer program according to example A.5.

A.7: Use of a biometric sensor at a receiving device of an aerosol-generating system for authenticating a user of the aerosol-generating system and/or for configuring an aerosol-generating device of the aerosol-generating system, which has a locked state and an unlocked state, into the locked or unlocked state based on transmitting an authentication signal from the receiving device to the aerosol-generating device, wherein the authentication signal is indicative of a successful or unsuccessful authentication of the user at the receiving device.

A.8: A user device for configuring an aerosol-generating device for an aerosol-generating system, the user device comprising:
 a user interface configured to receive a user input and/or to guide the user through an age verification process; and
 a controller configured to verify that the user has reached an age threshold based on guiding the user through the age verification process on the user interface, wherein the controller is configured to transmit an age verification signal to the receiving device upon successful verification that the user has reached the age threshold, wherein the age verification signal is indicative of the user having reached the age threshold.

B.8: The user device according to example A.8, wherein the controller is configured to instruct the receiving device, based on the age verification signal, to determine at least one age verification indicator indicative of the user having reached the age threshold.

C.8: The user device according to any of examples A.8 to B.8, wherein the controller is configured to instruct the receiving device to store the at least one age verification indicator in a data storage of the receiving device.

D.8: The user device according to any of examples A.8 to C.8, wherein the controller is configured to instruct the receiving device to store the at least one age verification indicator in a data storage of the aerosol-generating device based on instructing the receiving device to transmit the age verification indicator and/or the age verification signal to the aerosol-generating device.

E.8: The user device according to any of examples A.8 to D.8, wherein the controller is configured to provide one or more queries and/or one or more requests at the user interface.

F.8: The user device according to any of examples A.8 to E.8, wherein the controller is configured to receive and/or process one or more user inputs from the user interface in response to the one or more queries and/or one or more requests.

G.8: The user device according to any of examples A.8 to F.8, wherein the controller is configured to request personal data of the user for age verification based on providing one or more queries and/or one or more requests to the user at the user interface.

H.8: The user device according to any of examples A.8 to G.8, wherein the personal data relate to at least one of an identity card, a passport, a credit card, a driving license, and a social insurance number of the user.

I.8: The user device according to any of examples A.8 to H.8, wherein the controller is configured to provide a query to the user at the user interface for requesting the user to acquire, sense, determine and/or store one or more reference biometric features using the at least one biometric sensor of the receiving device.

J.8: The user device according to any of examples A.8 to I.8, wherein the controller is configured to transmit a control signal to the receiving deice to instruct the receiving device, based on the control signal, to acquire, sense, determine and/or store the one or more reference biometric features using the at least one biometric sensor of the receiving device.

A.9: A computer-implemented method of operating a user device for configuring and/or registering an aerosol-generating system, an aerosol-generating device and/or a receiving device for an aerosol-generating system, the method comprising:
 guiding, at a user interface of the user device, a user of the user device through an age verification process;
 verifying, at the user device, that the user has reached an age threshold; and
 transmitting an age verification signal from the user device to the receiving device upon verifying that the user has reached the age threshold, wherein the age verification signal is indicative of the user having reached the age threshold.

B.9: The method according to example A.9, further comprising instructing, based on the age verification signal, the receiving device to determine at least one age verification indicator indicative of the user having reached the age threshold.

C.9: The method according to any of examples A.9 to B.9, further comprising instructing the receiving device to store the at least one age verification indicator in a data storage of the receiving device.

D.9: The method according to any of examples A.9 to C.9, further comprising instructing the receiving device to store the at least one age verification indicator in a data storage of the aerosol-generating device based on instructing the receiving device to transmit the age verification indicator and/or the age verification signal to the aerosol-generating device.

E.9: The method according to any of examples A.9 to D.9, further comprising providing one or more queries and/or one or more requests at the user interface.

F.9: The method according to any of examples A.9 to E.9, further comprising receiving and/or processing one or more user inputs from the user interface in response to providing one or more queries and/or one or more requests at the user interface.

G.9: The method according to any of examples A.9 to F.9, further comprising requesting personal data of the user for age verification based on providing one or more queries and/or one or more requests to the user at the user interface.

H.9: The method according to any of examples A.9 to G.9, wherein the personal data relate to at least one of an identity card, a passport, a credit card, a driving license, and a social insurance number of the user.

I.9: The method according to any of examples A.9 to H.9, further comprising providing a query to the user at the user interface for requesting the user to acquire, sense, determine and/or store one or more reference biometric features using the at least one biometric sensor of the receiving device.

J.9: The method according to any of examples A.9 to I.9, further comprising transmitting a control signal to the receiving deice to instruct the receiving device, based on the control signal, to acquire, sense, determine and/or store the one or more reference biometric features using the at least one biometric sensor of the receiving device.

A.10: A computer program, which when executed by one or more processors of a user device, instructs the user device to perform steps of the method according to any of examples A.0 to J.9.

A.11: A non-transitory computer-readable medium storing the computer program according to example A.10.

Examples will now be further described with reference to the Figures in which:

The Figures are schematic only and not true to scale. In principle, identical or like parts, elements and/or steps are provided with identical or like reference numerals in the Figures.

FIG. 1 shows an aerosol-generating system 500 for generating aerosol, for example for consumption by a user.

Figure 1:
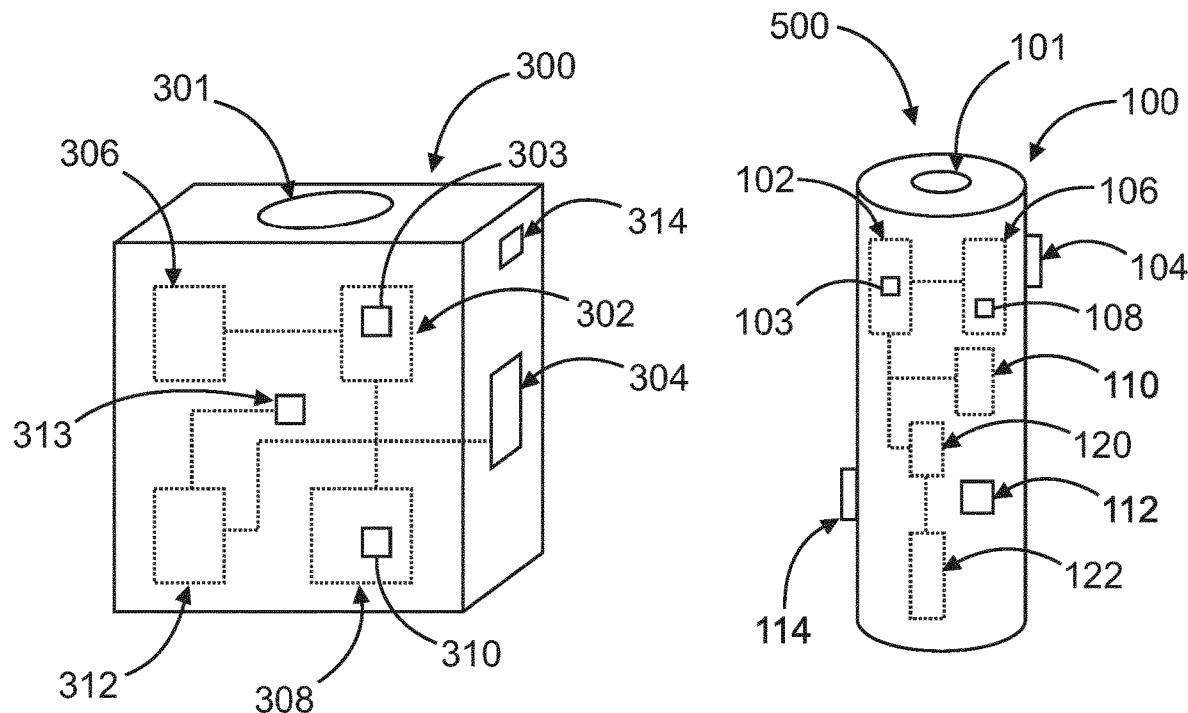
FIG. 1 shows an aerosol-generating system.

The system 500 comprises an aerosol-generating device 100 for generating aerosol and a receiving device 300 for at least partially receiving the aerosol-generating device 100. For example, the receiving device 300 may be configured for physically coupling the aerosol-generating device 100. For at least partially receiving the aerosol-generating device 100 and/or for physically coupling the aerosol-generating device 100 with the receiving device 300, the receiving device 300 of FIG. 1 includes an opening 301 or receiving opening 301, into which the aerosol-generating device 100 can be at least partially inserted, for example for storing and/or supporting the aerosol-generating device 100. Optionally, the receiving device 300 may include a cover for opening and closing the opening 301.

Alternatively or additionally, the receiving device 300 may be configured to at least partially receive the aerosol-generating device 100 based on coupling the aerosol-generating device 100 to a mechanical attachment or coupling mechanism of the receiving device 300, for example a hook mechanism, a latch mechanism, a snap-fit, or the like. Alternatively or additionally, the receiving device 300 may be configured to at least partially receive the aerosol-generating device 100 based on coupling the aerosol-generating device 100 with the receiving device 300 by means of a magnetic or electromagnetic coupling.

The aerosol-generating device 100 comprises an insertion opening 101 for at least partially inserting an aerosol-generating article (not shown). The aerosol-generating article may comprise an aerosol-forming substrate, such as a tobacco containing substrate, and/or a cartridge comprising a liquid.

For generating the aerosol during use or consumption of an aerosol-generating article, for example, the aerosol-generating device 100 comprises at least one heating element 120 or heat source 120 for applying heat to at least a portion of the aerosol-generating article.

For powering the at least one heating element 120 with electrical power, the aerosol-generating device 100 further comprises at least one energy storage 122 or energy supply 122 for storing electrical energy or power.

The aerosol-generating device 100 further includes a control circuitry 102 with one or more processors 103. The control circuitry 102 may be configured to control actuation, activation and/or deactivation of the at least one heating element 120.

To activate the heating element 120 for aerosol generation, the aerosol-generating device 100 further comprises an actuation element 104, such as a button, a switch or the like, which is actuatable by the user to activate and/or deactivate the aerosol-generating device 100 based on activating and/or deactivating the at least one heating element 120. Upon activation of the aerosol-generating device 100, the heating element 120 may be activated and heat may be applied to at least a part of the aerosol-generating article, such that aerosol can be generated for consumption by the user. Upon deactivation of the aerosol-generating device 100, the heating element 120 may be deactivated such that no or reduced heat may be applied to the at least a part of the aerosol-generating article, such that no aerosol can be generated for consumption by the user.

The aerosol-generating device 100 further comprises a communication circuitry 106 with one or more communication interfaces 108 for communicatively coupling the aerosol-generating device 100 with the receiving device 300, for example, via an Internet connection, a wireless LAN connection, a WiFi connection, a Bluetooth connection, a mobile phone network, a 3G connection, an edge connection, an LTE connection, a BUS connection, a wireless connection, a wired connection, a radio connection, a near field connection, and/or an IoT connection.

The aerosol-generating device 100 further comprises a data storage 110 for storing information or data, such as for example at least one authentication indicator, at least one age verification indicator, and/or other data.

The aerosol-generating device 100 further comprises a visual indicator 112, such as an LED, for providing one or more signals to the user, for example indicating a charge level of the at least one energy storage 122, indicating that the at least one energy storage should be charged, or the like. Alternatively or additionally, the visual indicator 112 may be configured to indicate a configuration or state of the aerosol-generating device 100.

The aerosol-generating device 100 comprises a locked state or configuration, in which the aerosol-generating device 100 is prohibited from generating aerosol, and an unlocked state, in which the aerosol-generating 100 is permitted to generate aerosol. Accordingly, the visual indicator 112 may be configured to indicate whether the aerosol-generating device is in the locked state or in the unlocked state.

In the locked state, the control circuitry 102 may, for example, be configured to prohibit activation of the heating element 120 based on at least one of disabling the at least one heating element 120, disabling an energy supply 122 for supplying electrical energy to the at least one heating element 120, and disabling the actuation element 104 of the aerosol-generating device 100 for actuating the at least one heating element 120 by the user.

The aerosol-generating device 100 further comprises at least one electrical connector 114 for coupling to a corresponding at least one electrical connector 313 of the receiving device 300. For example, when the aerosol-generating device 100 is at least partially inserted into the opening 301 of the receiving device 300, the one or more electrical connectors 114 of the aerosol-generating device 100 may be coupled with the one or more electrical connectors 313 of the receiving device 300 to charge the at least one energy storage 122 of the aerosol-generating device 100.

For this purpose, the receiving device 300 comprises a charger module 312 or charger circuitry 312 coupled to the electrical connector 313. The charger module 312 may, for example, be coupled to a supply grid for supplying the energy storage 122 of the aerosol-generating device 100 with electrical energy. Alternatively or additionally, the receiving device 300 may comprise one or more batteries, accumulators, capacitors or the like.

The receiving device 300 further comprises a control arrangement 302 with one or more processors 303. The control arrangement 302 may be configured to control the charger module 312 and/or other components or functions of the receiving device 300. It should be noted that also the charger circuitry or module 312 may be combined with or included in the control arrangement 302.

The receiving device 300 and/or the control arrangement 302 further comprises at least one biometric sensor 304 configured to authenticate a user of the aerosol-generating system 500 based on sensing at least one biometric feature of the user. Therein, the at least one biometric sensor 304 may be at least one of a fingerprint sensor, an iris recognition sensor, a voice recognition sensor, and a camera for face recognition.

The receiving device 300 further comprises a data storage 306 for storing information or data, such as at least one age verification indicator, at least one authentication indicator, one or more biometric features of the user, one or more reference biometric features of the user, and/or other data.

The control arrangement 302, the biometric sensor 304 and the data storage 306 may be embodied in a single unit. In this way, it is possible for the user to be authenticated without the biometric features leaving the single unit, thus improving security.

The receiving device 300 further comprises a communication arrangement 308 with one or more communication interfaces 310 for communicatively coupling the receiving device 300 with the aerosol-generating device 100, for example, via an Internet connection, a wireless LAN connection, a WiFi connection, a Bluetooth connection, a mobile phone network, a 3G connection, an edge connection, an LTE connection, a BUS connection, a wireless connection, a wired connection, a radio connection, a near field connection, and/or an IoT connection.

To authenticate the user and/or to determine an identity of the user, one or more reference biometric features of the user may be stored in the data storage 306. For example, the one or more reference biometric features of the user may be stored in the data storage 306 during a configuration, registration, age verification process, or set-up procedure of the aerosol-generating system 500.

Further, the receiving device 300 comprises a visual indicator 314, such as an LED, for providing one or more signals to the user, for example indicating a charge level of the at least one energy storage 122, indicating that the at least one energy storage should be charged, or the like. Alternatively or additionally, the visual indicator 314 may be configured to indicate a configuration or state of the aerosol-generating device 100, such as the locked state and/or the unlocked state. Further, the visual indicator 314 may be configured for requesting the user to acquire and/or sense one or more biometric features for authenticating the user.

For example, the control arrangement 302 may be configured to activate the visual indicator 314 such that the user senses one or more biometric features with the at least one biometric sensor 304. Further, the control arrangement 302 may be configured to compare the one or more biometric features sensed with the at least one biometric sensor 304 with the one or more reference biometric features stored in the data storage 306. Further, the control arrangement 302 may be configured to determine at least one reference biometric feature substantially matching at least one of the sensed biometric features, such that the user may be successfully authenticated. If no matching reference biometric feature can be determined by the control arrangement 302, the user may be unsuccessfully authenticated.

The control arrangement 302 of the receiving device 300 is further configured to generate, based on the sensed one or more biometric features, an authentication signal indicative of a successful or an unsuccessful authentication of the user at the receiving device 300. Further, the control arrangement 302 may be configured to transmit, via the communication arrangement 308 the authentication signal to the aerosol-generating device 100 to configure the aerosol-generating device 100 into the locked state or the unlocked state.

For example, when the authentication of the user is unsuccessful, the aerosol-generating device 100 may be configured into the locked state based on the authentication signal. Alternatively, no authentication signal may be transmitted upon unsuccessful authentication of the user at the receiving device 300. Alternatively or additionally, when the authentication of the user is successful, the aerosol-generating device 100 may be configured into the unlocked state based on the authentication signal.

For example, the aerosol-generating system 500, the aerosol-generating device 100 and/or the receiving device 300 may be configured to enter the aerosol-generating device 100 into the locked state based on one or more locking conditions. The one or more locking conditions may include determining at least one of a maximum number of usage sessions of the aerosol-generating device by the user since the last successful authorization of the user at the receiving device, a maximum number of charge cycles performed since the last successful authorization of the user at the receiving device, and a maximum period of time expired since the last successful authorization of the user at the receiving device.

Further, the control circuitry 102 of the aerosol-generating device 100 may be configured to determine, based on the authentication signal received from the receiving device 300, an authentication indicator and to store the authentication indicator in the data storage 110. For instance, the control circuitry 102 of the aerosol-generating device 100 may be configured to enter the aerosol-generating device 100 into the locked state or the unlocked state based on the authentication indicator stored in the data storage 110 of the aerosol-generating device 100, based on a value of the authentication indicator, based on a presence of the authentication indicator in the data storage 110 and/or based on absence of the authentication indicator in the data storage 110. Optionally, the authentication indicator may only be stored if successful authentication of the user at the receiving device is indicated by the authentication signal.

For instance, the control circuitry 102 of the aerosol-generating device 100 may be configured to modify a value of the authentication indicator stored in the data storage 11 of the aerosol-generating device 100 upon successful authentication of the user at the receiving device 300, such that the aerosol-generating device 100 is configured into the unlocked state.

For instance, the aerosol-generating device 100 may be configured into the locked state in absence of the authentication indicator in the data storage of the aerosol-generating device. Alternatively or additionally, the aerosol-generating device 100 may be configured into the unlocked state if the authentication indicator is stored in the data storage of the aerosol-generating device.

Alternatively or additionally, the aerosol-generating device 100 may be configured into the locked state, when a value of the authentication indicator in the data storage of the aerosol-generating device takes a predefined value associated with the locked state. Alternatively or additionally, the aerosol-generating device 100 may be configured into the unlocked state, when a value of the authentication indicator in the data storage of the aerosol-generating device takes a further predefined value different than the predefined value.

Moreover, the control circuitry 102 of the aerosol-generating device 100 may be configured to periodically erase the data storage 110 for storing the authentication indicator, such that the aerosol-generating device 100 is periodically configured into the locked state, for example based on one or more locking conditions. Alternatively or additionally, the control circuitry 102 of the aerosol-generating device 100 may be configured to periodically modify a value of the authentication indicator stored in the data storage 110, such that the aerosol-generating device 100 is periodically configured into the locked state, for example based on one or more locking conditions.

Further, at least one age verification indicator indicative of the user reaching or having reached an age threshold may be stored in the data storage 110 of the aerosol-generating device 100 and/or the receiving device 300. Upon successful authorization of the user at the receiving device 300, the control arrangement 302 may be configured to determine, based on the age verification indicator, that the user has reached the age threshold. Further, the control arrangement 302 of the receiving device 300 may be configured to transmit the authentication signal to the aerosol-generating device 100 upon determining that the user has reached the age threshold.

Moreover, the receiving device 300 may be further configured for being communicatively coupled with a user device 700 (see FIG. 3) of the user, wherein the receiving device 300 may be configured to store the age verification indicator in the data storage 306 of the receiving device 300 upon receipt of an age verification signal from the user device 700, wherein the age verification signal is indicative of the user reaching or having reached the age threshold. Based on or using the user device 700, the user may be guided through an age verification process, as will be further described with reference to subsequent figures.

In the following, various examples, exemplary embodiments, illustrative examples, achievements and/or advantages of the present disclosure are described and summarized.

The aerosol-generating system 500 may refer to a smoking system 500, wherein the receiving device 300 may be considered as charging device or unit for charging the aerosol-generating device 100. Further, the control arrangement 302 with the at least one biometric sensor 304 of the receiving device 300 may be configured for recognizing an identity of the user and for configuring the aerosol-generating device 100 into the locked or unlocked state depending on whether or not the authorization or identity recognition of the user at the receiving device 300 was successful. Accordingly, the control arrangement 302 with the at least one biometric sensor 304 may be considered as user identity recognition module, unit or circuitry with locking or unlocking function, wherein the control arrangement 302 and/or receiving device 300 may communicate with the aerosol-generating device 100 to configure the aerosol-generating device 100 into the locked or unlocked state based on the authentication signal.

Some conventional or prior art smoking systems or aerosol-generating devices may include a fingerprint sensor located directly at a handheld vaporizer. In contrast thereto, the aerosol-generating system 500 exemplary shown in FIG. 1 includes a biometric sensor 304 that is arranged or located at the receiving device 300. This arrangement of the biometric sensor 304 may allow to implement comprehensive identity recognition means and/or authentication means in the aerosol-generating system 300, which comprises the receiving device 300 and the aerosol-generating device 100, without adding additional design complications, in particular to the aerosol-generating device 100 and/or to a physical or mechanical coupling between the receiving device 300 and the aerosol-generating device 100.

In the example of FIG. 1, the aerosol-generating device 100 can be at least partially inserted into the opening 301 of the receiving device 300. Hence, arranging a sensor at the aerosol-generating device 100 would potentially entail the presence of a protrusion on an external wall of the aerosol-generating device 100, which would determine a correspondent modification of the receiving device 300, and specifically in its receiving opening 301 and/or a receiving groove.

By arranging the biometric sensor 304 at the receiving device 300, the external wall of the aerosol-generating device can be generally smooth, and no modification on the coupling with the receiving device 300, such as an arrangement of matching grooves to accommodate the protrusion generated by the sensor, may be required.

Further, the aerosol-generating system 500 of the present disclosure advantageously allows for a periodic user validation check or user authentication, for example based on or based on determining one or more locking conditions. In particular, biometric identification or authentication can be implemented in the system 500 to restrict the use of the aerosol-generating device 100 for aerosol consumption to validated or authorized users. Further, comprehensive protection against unauthorized use, for example underage users such as children, and in the case of a lost or stolen aerosol-generating device 100.

For instance, based on the one or more locking conditions, an identification or authentication may be required after a certain number of experiences or usage sessions, after a certain time period or both. Further, a master user can be registered or configured via a user device 700. Such registration may, for example, be required only once and the master user could certify or authorize other "normal" users.

The authentication process may, for example, be implemented in the system 500, as follows. When the aerosol-generating device 100 is at least partially inserted into the opening 301 of the receiving device 300, the user may be requested to sense at least one biometric feature, for example present a finger to the sensor 304 for checking a fingerprint, if the aerosol-generating device 100 is in the locked state and/or not already fingerprint verified. Further, the authentication signal, which may refer to an authentication status, may be transmitted to the aerosol-generating device 100, for example, in a secure encrypted manner, in order to configure the aerosol-generating device 100 into the unlocked state. Optionally, there could be a shared secret between the receiving device 300 and the aerosol-generating device 100 that may prevent a replay attack on the aerosol-generating device 100 to configure it into the unlocked state. As the authentication signal is transmitted by the receiving device 300, the receiving device 300 could be used for configuring a plurality of aerosol-generating devices 100. However, it is possible for the receiving device 300 and the aerosol-generating device 100 to be tied to one another, so that the receiving device 300 may only configure a single aerosol-generating device 100 into the unlocked state or the locked state.

Further, the receiving device 300 may be configured to charge the energy storage 122 of the aerosol-generating device, for example even in case of an unsuccessful authorization at the receiving device 300 or in case the aerosol-generating device 100 is in the locked state. However, once the energy storage 122 is ended, the aerosol-generating device 100 may remain in the locked state until successful authorization of a user at the receiving device 300. For instance, a number of experiences or usage sessions granted for use on the aerosol-generating device 100 may be deferred or set to zero. Accordingly, the energy storage 122 may be fully charged, but the experiences or usage sessions of aerosol consumption may be deferred until successful authorization. This may avoid long waiting time after successful authorization and granting of the experience(s) and/or usage session(s).

Alternatively, the receiving device 300 may be configured to charge the energy storage 122 of the aerosol-generating device only if there has been a successful authorization of the user at the receiving device 300. In this example, the locked state may be considered as when the energy storage 122 of the aerosol-generating device does not contain enough charge to cause aerosol to be generated, and the unlocked state may be considered as when the energy storage contains enough charge to cause aerosol to be generated. The authentication signal may then be considered as the provision of charge to the energy storage 122 of the aerosol-generating device by the receiving device 300.

An exemplary authentication process or configuration of the aerosol-generating device 100 from the locked into the unlocked state may be implemented as follows. The aerosol-generating device 100 may be in the locked state and the energy storage 122 may be empty. When the aerosol-generating device is at least partially inserted into the opening 301 of the receiving device 300, the latter may provide a visual signal with the indicator 314 to indicate that the identity recognition or authorization is needed. This, as mentioned above, may be periodically triggered after a certain time period and/or number of usage sessions, or the like. For example, the visual indicator 314 may signal a blue light flashing or blinking, thereby signalling to the user that the biometric feature, such as a fingerprint, is to be sensed or is requested. Upon unsuccessful authorization, for example in case no matching reference biometric feature can be identified, the aerosol-generating device 100 may remain in the locked state and the visual indicator 314 of the receiving device 300 may continue blinking. Upon sensing a biometric feature that matches one of the reference biometric features, the authentication signal may be transmitted to the aerosol-generating device 100 and the visual indicator 314 of the receiving device 300 may become stable and/or may change colour, for example to white colour, thereby indicating successful authorization of the user at the receiving device 300 and configuration of the aerosol-generating device 100 into the unlocked state. Further, in the locked state, and/or in case of an empty energy storage 122, the visual indicator 112 of the aerosol-generating device 100 may be off, it may blink during charging, and become solid or constant, when the energy storage 122 is charged and/or the device 100 is in the unlocked state.

Figure 2:
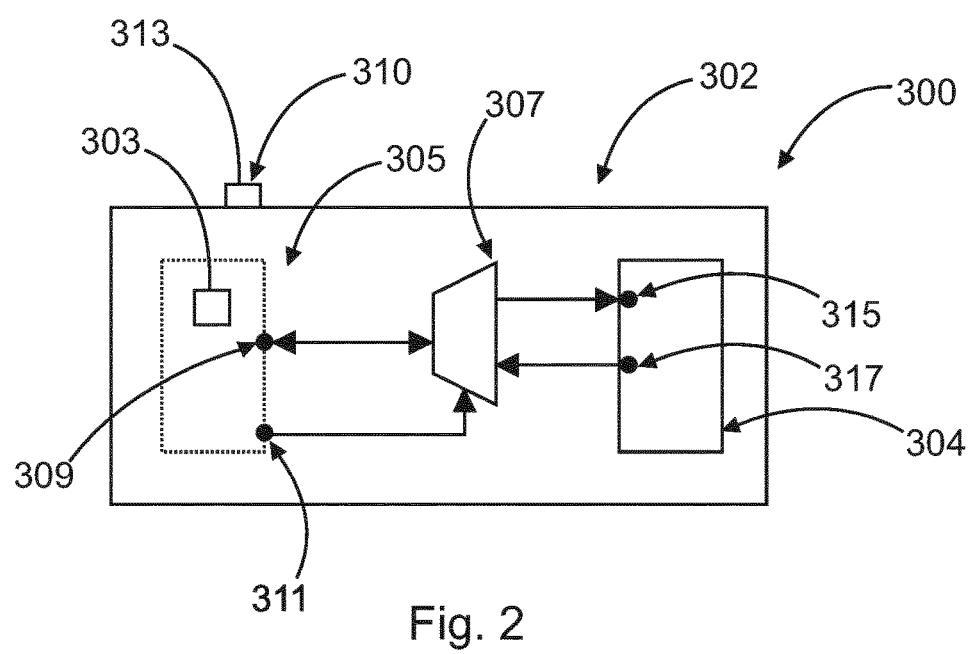
FIG. 2 shows a block diagram of a part of a receiving device for an aerosol-generating system.

FIG. 2 shows a block diagram of a part of a receiving device 300 for an aerosol-generating system 500. Unless stated otherwise, the receiving device 300 of FIG. 2 comprises the same features, elements and/or functions as the receiving device 300 described with reference to FIG. 1.

Specifically, FIG. 2 schematically shows at least a part 305 of the control arrangement 302, which includes the at least one processor 303 and which is coupled with the at least one biometric sensor 304 via a multiplexer 307. Therein, the part 305 may be coupled with or comprise the charger circuitry 312 and/or other electrical components of the receiving device 300. For example, the at least part 305 of the control arrangement 302 exemplary shown in FIG. 2 may refer to a main controller 305 of the receiving device 300.

For instance, the biometric sensor 304, such as a fingerprint module, may be powered by the control arrangement 302 and/or part 305, for example via a power output, such as a low-dropout (LDO) regulator output at 3.3 Volts.

Further, a port 309, such as a one-wire MT communication port (referred to as "MTRTX" port), may be used for coupling the control arrangement 302 to the multiplexer 307. This one-wire communication may be converted via the multiplexer 307 to a two-wire communication. For example, signals can be transmitted from the multiplexer 307 to an input port 315 (such as an RX port) of the sensor 304, and signals can be transmitted from an output port 317 (such as a TX port) of the sensor 304 to the multiplexer 307. Therein, the multiplexer 307 may be controlled by the control arrangement 302 via a port 311, for example an LED signal port or any other signal port.

Further, in the example shown in FIG. 2, at least one communication interface 310 is combined with or integrated in the electrical connector 313, such that an electrical connection for charging the energy storage 122 of the aerosol-generating device 100 and a communicative coupling between the aerosol-generating device 100 and the receiving device 300 can be established via the electrical connector(s) 114 of the aerosol-generating device 100 and the connector(s) 313 of the receiving device.

Figure 3:
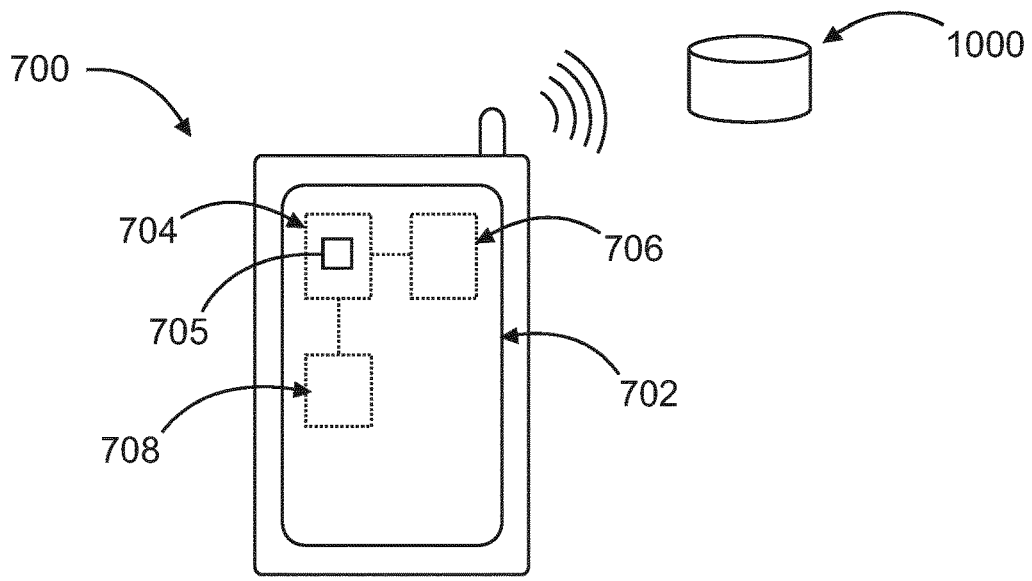
FIG. 3 shows a user device for configuring an aerosol-generating system.

FIG. 3 shows a user device 700 for configuring and/or registering one or more of an aerosol-generating system 500, an aerosol-generating device 100, and a receiving device 300. Generally, the user device 700 may be part of an aerosol-generating system 500.

The user device 700 comprises a user interface 702 configured to receive a user input and/or to guide the user through an age verification process, for example based on providing or outputting information or data to the user via the user interface 702.

The user device 700 further comprises a controller 704 or control circuitry 702 configured to verify that the user has reached an age threshold based on guiding the user through the age verification process on the user interface 702. Therein, the controller 702 may comprise one or more processors 705 for data processing.

The user device 700 further comprises a communication circuitry 706 for communicatively coupling the user device 700 to one or more of a server 1000, an aerosol-generating system 500, a receiving device 300 and/or an aerosol-generating device 100. Further the user device 700 comprises a data storage 708 for storing data or information.

Further, the controller 704 may be configured to transmit an age verification signal to the receiving device 300 upon successful verification that the user has reached the age threshold, wherein the age verification signal is indicative of the user having reached the age threshold.

Alternatively or additionally, the controller 704 may be configured to instruct the receiving device, based on the age verification signal, to determine at least one age verification indicator indicative of the user having reached the age threshold. Alternatively or additionally, the controller 704 may be configured to instruct the receiving device 300 and/or the aerosol-generating device 100 to store the at least one age verification indicator based on the transmitted age verification signal.

For guiding the user thorough the age verification process or for registering, the controller 704 may be configured to provide one or more queries and/or one or more requests at the user interface 702. Alternatively or additionally, the controller 704 may be configured to receive and/or process one or more user inputs from the user interface 702 in response to the one or more queries and/or one or more requests. For instance, personal data of the user may be requested for age verification based on providing one or more queries and/or one or more requests to the user at the user interface 702. Such personal data may relate to at least one of an identity card, a passport, a credit card, a driving license, and a social insurance number of the user.

Some or all of the personal information may be transmitted to the server 1000 for age verification and/or for registering the aerosol-generating system 500 to the user, for example in an account of the user stored at the server 1000.

Further, the controller 704 may be configured to provide a query to the user at the user interface 702 for requesting the user to acquire, sense, determine and/or store one or more reference biometric features using the at least one biometric sensor 304 of the receiving device 300. For instance, a corresponding control signal may be transmitted to the receiving device 300, for example triggering the visual indicator 314 thereof to indicate that the user should sense one or more reference biometric features.

In the following, an illustrative example of a user registration process using the user device 700 is summarized. The user device 700, such as a smartphone or a PC in a retail store, may send a message or signal to the aerosol-generating system 500, the aerosol-generating device 100 and/or the receiving device 300 that the user has been age verified at the user device 700 and/or at the server 1000. Then, the biometric sensor 304 may be activated for registration of the user at the aerosol-generating system 500, the aerosol-generating device 100 and/or the receiving device 300. Upon receipt or sensing of one or more reference biometric features, the one or more reference biometric features may be stored in the receiving device 300 and/or the aerosol-generating device 100, for example in the form of a biometric signature of the user, optionally in association with at least one age verification indicator, such as some kind of flag, that this signature and/or the one or more reference biometric features are age verified. Therefore, when the biometric sensor 304 receives a further biometric feature, such as a further fingerprint, in the future it may match at least one of the one or more reference biometric features and/or the signature, and the user can be identified as being one that is age verified. In this way, it is possible to avoid sending any fingerprint data outside of the receiving device 300, thereby preserving privacy of the user or its personal data.

Figure 4:
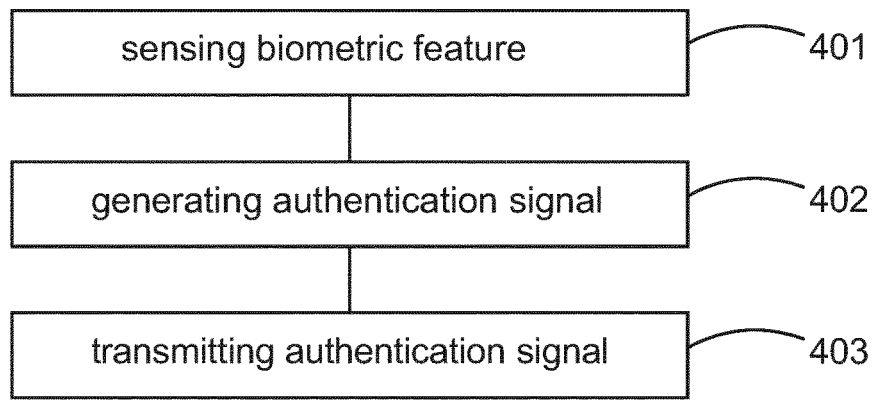
FIG. 4 shows a flowchart illustrating a method of authenticating a user at an aerosol-generating system.

FIG. 4 shows a flowchart illustrating a method of authenticating a user at and/or a method of operating an aerosol-generating system 500, a receiving device 300 for an aerosol-generating system 500 and/or an aerosol-generating device 100 for an aerosol-generating system 500. Unless stated otherwise, the aerosol-generating system 500, the receiving device 300 and/or the aerosol-generating device 100 comprise the same features, elements and/or functions as described with reference to the foregoing Figures.

Step 401 comprises sensing, with a biometric sensor 304 arranged at the receiving device 300, at least one biometric feature of the user to authenticate the user.

Step 402 comprises generating, at the receiving device 300, an authentication signal indicative of a successful or an unsuccessful authentication of the user at the receiving device 300.

Further, step 403 comprises transmitting the authentication signal to the aerosol-generating device 100 to configure and/or thereby configuring the aerosol-generating device 100 into the locked state or the unlocked state based on the authentication signal.

The method illustrated in FIG. 4 can comprise numerous alternative or additional steps, for example as described with reference to any of the first to eleventh aspect of the present disclosure.

Figure 5:
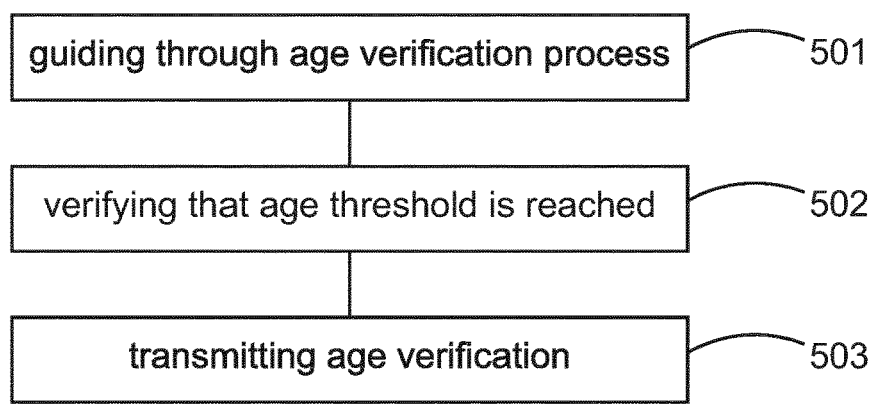
FIG. 5 shows a flowchart illustrating a method of configuring an aerosol-generating system with a user device.

FIG. 5 shows a flowchart illustrating a method of configuring one or more of an aerosol-generating system 500, a receiving device 300 for an aerosol-generating system 500 and/or an aerosol-generating device 100 for an aerosol-generating system 500 with a user device 700. Unless stated otherwise, the aerosol-generating system 500, the receiving device 300, the aerosol-generating device 100, and/or the user device 700 comprise the same features, elements and/or functions as described with reference to the foregoing Figures.

Step 501 comprises guiding, at a user interface 702 of the user device 700, a user of the user device 700 through an age verification process.

Step 502 comprises verifying, at the user device 700, that the user has reached an age threshold.

Further, step 503 comprises transmitting an age verification signal from the user device 700 to the receiving device 300 upon verifying that the user has reached the age threshold, wherein the age verification signal is indicative of the user having reached the age threshold.

The method illustrated in FIG. 5 can comprise numerous alternative or additional steps, for example as described with reference to any of the first to eleventh aspect of the present disclosure.

Figure 6:
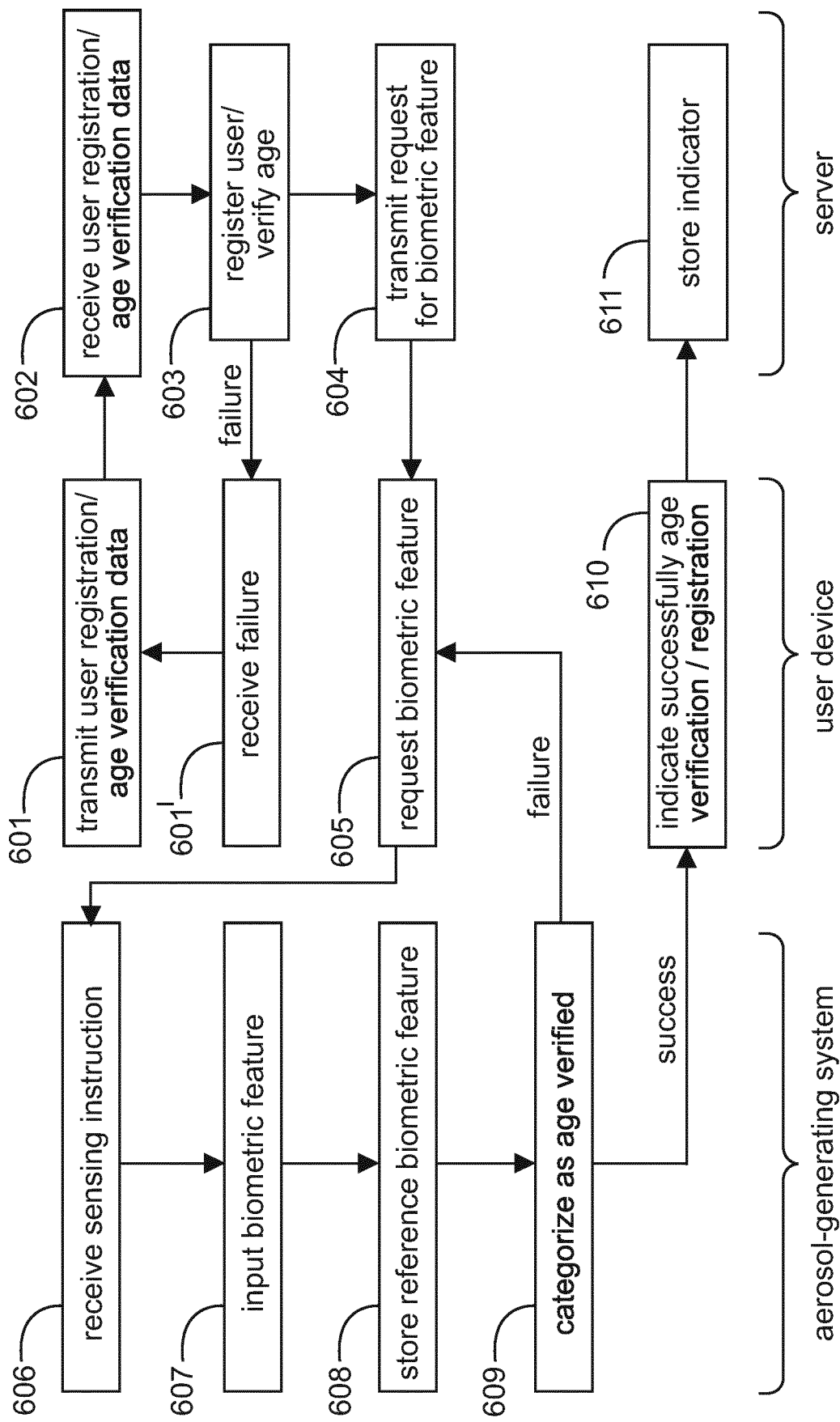
FIG. 6 shows a flowchart illustrating a method of configuring an aerosol-generating system with a user device.

FIG. 6 shows a flowchart illustrating a method of configuring one or more of an aerosol-generating system 500, a receiving device 300 for an aerosol-generating system 500 and/or an aerosol-generating device 100 for an aerosol-generating system 500 with a user device 700. Unless stated otherwise, the aerosol-generating system 500, the receiving device 300, the aerosol-generating device 100, and/or the user device 700 comprise the same features, elements and/or functions as described with reference to the foregoing Figures. The method of FIG. 6 may illustrate an initial set-up procedure, age verification process or registration process, for example prior to a first use of the system 500 for aerosol consumption by a user.

In step 601 user registration information or data and/or age verification data is transmitted from the user device 700 to a server 1000. The server 1000 receives the user registration information or data and/or age verification data at step 602.

In step 603, the user is registered and/or the age of the user is verified as being equal to or above the age threshold. Upon unsuccessful verification at the server 1000, a failure may be transmitted to the user device 700 that is received at the user device 700 at step 601' and triggers step 601 to be repeated.

Upon successful verification at the server 1000, for example based on personal data of the user, a request for one or more reference biometric features, such as a request for a fingerprint, is transmitted in step 604 from the server 1000 to the user device 700, and the request is received at the user device at step 605. The received request may trigger prompting the user, for instance based on one or more queries, to provide or acquire one or more reference biometric features using the biometric sensor 304 at the receiving device 300.

For instance, a sensing instruction, such as a fingerprint initiation instruction, may be received at the receiving device 300 and/or the aerosol-generating system 500 at step 606.

At step 607, the one or more reference biometric features, such as fingerprint data or a fingerprint signature, may be acquired by the biometric sensor 304, and stored in the data storage 306 of the receiving device 300 and/or the data storage of the aerosol-generating device 100 at step 608.

Further, the stored one or more reference biometric features may be categorized in step 609 as being age verified, for example based on an age verification signal transmitted from the user device 700 to the receiving device 300, either separately or in combination with the request received at step 606. Therein, categorizing may comprise storing an age verification indicator in the receiving device 300 and/or the aerosol-generating device 100, wherein the age verification indicator may be associated with the one or more stored reference biometric features.

Upon failure of the categorization and registration of the user at step 609, step 605 may be re-executed and the procedure may restart at step 606.

Upon successful categorization and registration of the user at step 609, the aerosol-generating device 100 may be used by the user for aerosol consumption.

Further, the successful registration of the one or more reference biometric features can be indicated to the user device 700 at step 610, for example based on transmitting a corresponding signal from the receiving device 300 to the user device 700.

Further, at step 611, a signal indicating the successful registration of the one or more reference biometric features may be transmitted from the user device 700 to the server 1000, and the server 1000 may store a corresponding indication that the one or more reference biometric features have been successfully registered and age verified at the receiving device 300.

The method illustrated in FIG. 6 can comprise numerous alternative or additional steps, for example as described with reference to any of the first to eleventh aspect of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An aerosol-generating system, comprising:
    an aerosol-generating device configured to generate aerosol, the aerosol-generating device having a locked state in which the aerosol-generating device is prohibited from generating aerosol and an unlocked state in which the aerosol-generating device is permitted to generate aerosol; and
    a receiving device configured to at least partially receive the aerosol-generating device,
    wherein each of the aerosol-generating device and the receiving device includes a communication interface configured to communicatively couple the aerosol-generating device with the receiving device,
    wherein the receiving device includes a control arrangement with at least one biometric sensor configured to authenticate a user of the aerosol-generating system based on sensing at least one biometric feature of the user, and
    wherein the control arrangement is configured to transmit an authentication signal to the aerosol-generating device to configure the aerosol-generating device into the locked state or into the unlocked state, the authentication signal being indicative of a successful authentication of the user at the receiving device or of an unsuccessful authentication of the user at the receiving device.

2. The aerosol-generating system according to claim 1, wherein the at least one biometric sensor is at least one of a fingerprint sensor, an iris recognition sensor, a voice recognition sensor, and a camera for face recognition.

3. The aerosol-generating system according to claim 1,
    wherein the aerosol-generating device further includes at least one energy storage configured to store electrical energy, and
    wherein the receiving device is further configured to supply electrical energy to the aerosol-generating device to charge the at least one energy storage of the aerosol-generating device.

4. The aerosol-generating system according to claim 1, wherein the aerosol-generating system is configured to enter the aerosol-generating device into the locked state based on one or more locking conditions.

5. The aerosol-generating system according to claim 4, wherein the one or more locking conditions include determining at least one of:
    a maximum number of usage sessions of the aerosol-generating device by the user since a last successful authorization of the user at the receiving device,
    a maximum number of charge cycles performed since the last successful authorization of the user at the receiving device, and
    a maximum period of time expired since the last successful authorization of the user at the receiving device.

6. The aerosol-generating system according to claim 1, wherein the aerosol-generating device further includes:
    a data storage; and
    a control circuitry configured to determine, based on the authentication signal received from the receiving device, an authentication indicator, and to store the authentication indicator in the data storage.

7. The aerosol-generating system according to claim 6, wherein the control circuitry of the aerosol-generating device is further configured to enter the aerosol-generating device into the locked state or into the unlocked state based on the authentication indicator stored in the data storage of the aerosol-generating device.

8. The aerosol-generating system according to claim 7, wherein the control circuitry of the aerosol-generating device is further configured to:
- enter the aerosol-generating device into the locked state in an absence of the authentication indicator in the data storage of the aerosol-generating device, and/or
- enter the aerosol-generating device into the locked state when a value of the authentication indicator in the data storage of the aerosol-generating device takes a first predefined value.

9. The aerosol-generating system according to claim 7, wherein the control circuitry of the aerosol-generating device is further configured to:
- enter the aerosol-generating device into the unlocked state if the authentication indicator is stored in the data storage of the aerosol-generating device, and/or
- enter the aerosol-generating device into the unlocked state when a value of the authentication indicator in the data storage of the aerosol-generating device takes a second predefined value.

10. The aerosol-generating system according to claim 7, wherein the control circuitry of the aerosol-generating device is further configured to:
- remove the authentication indicator from the data storage of the aerosol-generating device, such that the aerosol-generating device is configured into the locked state, and/or
- modify a value of the authentication indicator, such that the aerosol-generating device is configured into the locked state.

11. The aerosol-generating system according to claim 7, wherein, to enter the aerosol-generating device into the locked state, the control circuitry of the aerosol-generating device is further configured to:
- remove the authentication indicator from the data storage of the aerosol-generating device based on one or more locking conditions, and/or
- modify a value of the authentication indicator stored in the data storage of the aerosol-generating device based on the one or more locking conditions.

12. The aerosol-generating system according to claim 1, wherein the control arrangement of the receiving device is further configured to transmit the authentication signal to the aerosol-generating device only upon successful authentication of the user at the receiving device, and/or
wherein the authentication signal is indicative of successful authentication of the user at the receiving device.

13. The aerosol-generating system according to claim 1, further comprising a user device communicatively coupled with the receiving device,
wherein the user device includes a user interface and a controller configured to verify that the user has reached an age threshold based on guiding the user through an age verification process on the user interface, and
wherein the controller is further configured to transmit an age verification signal to the receiving device upon successful verification that the user has reached the age threshold.

14. A receiving device for an aerosol-generating system, the receiving device comprising:
- a communication interface configured to communicatively couple the receiving device with an aerosol-generating device of the aerosol-generating system, the aerosol-generating device having a locked state in which the aerosol-generating device is prohibited from generating aerosol and an unlocked state in which the aerosol-generating device is permitted to generate aerosol; and
- a control arrangement with at least one biometric sensor configured to authenticate a user of the receiving device based on sensing at least one biometric feature of the user,
wherein the control arrangement is configured to transmit an authentication signal to the aerosol-generating device to configure the aerosol-generating device into the locked state or into the unlocked state, the authentication signal being indicative of a successful authentication of the user at the receiving device or of an unsuccessful authentication of the user at the receiving device.

15. An aerosol-generating device for an aerosol-generating system, the aerosol-generating device comprising:
- a communication interface configured to communicatively couple the aerosol-generating device with a receiving device of the aerosol-generating system,
wherein the aerosol-generating device is configured to receive, via the communication interface, an authentication signal from the receiving device, the authentication signal being indicative of a successful or an unsuccessful authentication of the user at the receiving device using a biometric sensor at the receiving device, and
wherein the aerosol-generating device has a locked state in which the aerosol-generating device is prohibited from generating aerosol and an unlocked state in which the aerosol-generating device is permitted to generate aerosol; and
- a control circuitry configured to enter the aerosol-generating device into the locked state or into the unlocked state based on the authentication signal received from the receiving device.

* * * * *